(12) United States Patent
Harvey et al.

(10) Patent No.: US 12,355,226 B2
(45) Date of Patent: Jul. 8, 2025

(54) APPARATUS AND METHOD FOR TEMPORARILY SUSPENDING CONDUCTORS

(71) Applicant: Quanta Associates, L.P., Houston, TX (US)

(72) Inventors: Benjamin James Harvey, La Grange, TX (US); Daniel Neil O'Connell, Burnaby (CA); Raymond Henry Jodoin, Burnaby (CA)

(73) Assignee: Quanta Associates, L.P., Houston, TX (US)

( * ) Notice: Subject to any disclaimer, the term of this patent is extended or adjusted under 35 U.S.C. 154(b) by 351 days.

(21) Appl. No.: 17/975,190

(22) Filed: Oct. 27, 2022

(65) Prior Publication Data
US 2023/0128295 A1  Apr. 27, 2023

Related U.S. Application Data

(60) Provisional application No. 63/272,468, filed on Oct. 27, 2021.

(30) Foreign Application Priority Data

Oct. 27, 2021 (CA) ..................... 3135940

(51) Int. Cl.
*H02G 7/06* (2006.01)
(52) U.S. Cl.
CPC ..................... *H02G 7/06* (2013.01)
(58) Field of Classification Search
CPC ....................................... H02G 7/06
(Continued)

(56) References Cited

U.S. PATENT DOCUMENTS

| 3,978,276 A | * | 8/1976 | Poffenberger | ......... | H02G 7/125 |
| | | | | | 174/42 |
| 4,020,277 A | * | 4/1977 | La Chance, Sr. | ........ | H02G 7/20 |
| | | | | | 248/74.1 |

(Continued)

FOREIGN PATENT DOCUMENTS

| KR | 100913235 B1 | 8/2009 |
| WO | 2021/183906 A1 | 9/2021 |

OTHER PUBLICATIONS

Screen capture titled "Conductor Lifting Tools for Stringing Bundled Conductors" from Ningbo Huaxiang Dongfang Machinery and Tools of Power Co., Ltd., Zhejiang, China website, https://www.nbdf-stringingequipments.com/products/Conductor-Lifting-Tools-for-stringing-bundled-conductors-3334900.html, taken Feb. 2, 2023, and FIG. 1, from U.S. Appl. No. 63/272,468, filed Oct. 27, 2021, which is an illustration of the screen capture showing prior art,.2 pages.

(Continued)

*Primary Examiner* — Stanley Tso
(74) *Attorney, Agent, or Firm* — Oathout Law Firm; Antony C. Edwards; Laura Tu

(57) ABSTRACT

A set of components for assembling a temporary wire suspender includes in the set a yoke plate, a plurality of J-hook assemblies, a plurality of linkage members, and a plurality of removable couplers configurable to handle an expandable number of energized or de-energized conductors or sub-conductors. Positive control of the suspended and/or supported energized or de-energized conductors or sub-conductors is achieved by using releasable latches on the J-hook assemblies.

36 Claims, 29 Drawing Sheets

(58) Field of Classification Search
USPC .......................................................... 174/146
See application file for complete search history.

(56) References Cited

U.S. PATENT DOCUMENTS

| | | | | |
|---|---|---|---|---|
| 4,323,722 | A * | 4/1982 | Winkelman | H02G 7/20 |
| | | | | 174/43 |
| 7,535,132 | B2 | 5/2009 | Devine et al. | |
| 8,573,562 | B2 * | 11/2013 | Devine | H02G 1/02 |
| | | | | 174/40 R |
| 10,218,162 | B2 | 2/2019 | Talabathula et al. | |
| 11,652,344 | B2 * | 5/2023 | Ciesielczyk | H02G 7/12 |
| | | | | 174/146 |
| 2008/0054235 | A1 * | 3/2008 | Devine | H02G 7/02 |
| | | | | 254/134.3 PA |
| 2008/0203243 | A1 | 8/2008 | Cho | |
| 2010/0012351 | A1 * | 1/2010 | Boisclair | H02G 7/12 |
| | | | | 174/146 |
| 2016/0155545 | A1 | 6/2016 | Niles et al. | |
| 2021/0273436 | A1 | 9/2021 | Ciesielczyk et al. | |
| 2021/0288481 | A1 | 9/2021 | O'Connell et al. | |

OTHER PUBLICATIONS

Rodriquez, Kari, International Search Report for PCT/US2022/048040, Feb. 8, 2023, 2 pages, ISA/US, Alexandria, Virginia.

Rodriquez, Kari, Written Opinion of the International Searching Authority for PCT/US2022/048040, Feb. 8, 2023, 6 pages, ISA/US, Alexandria, Virginia.

* cited by examiner

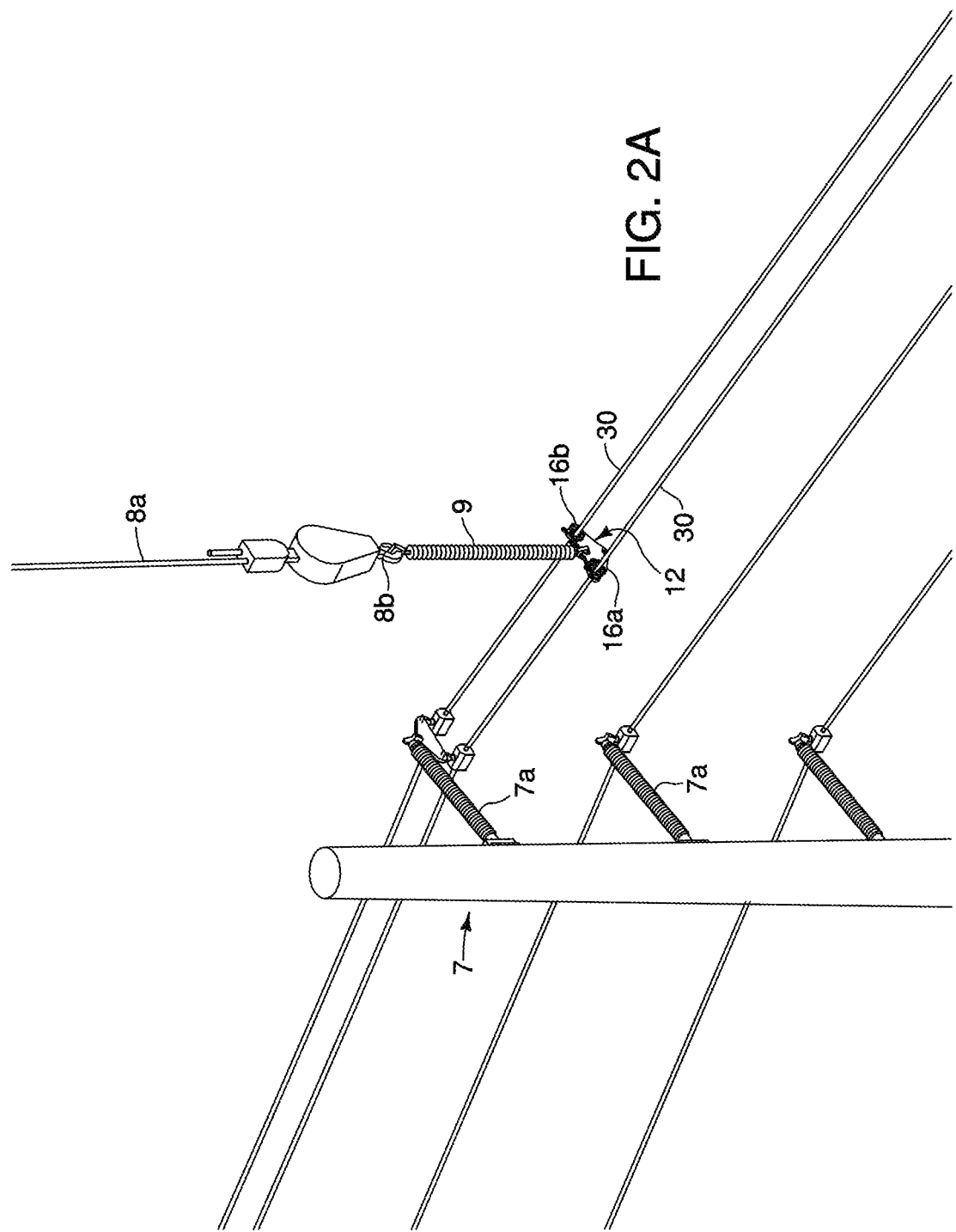

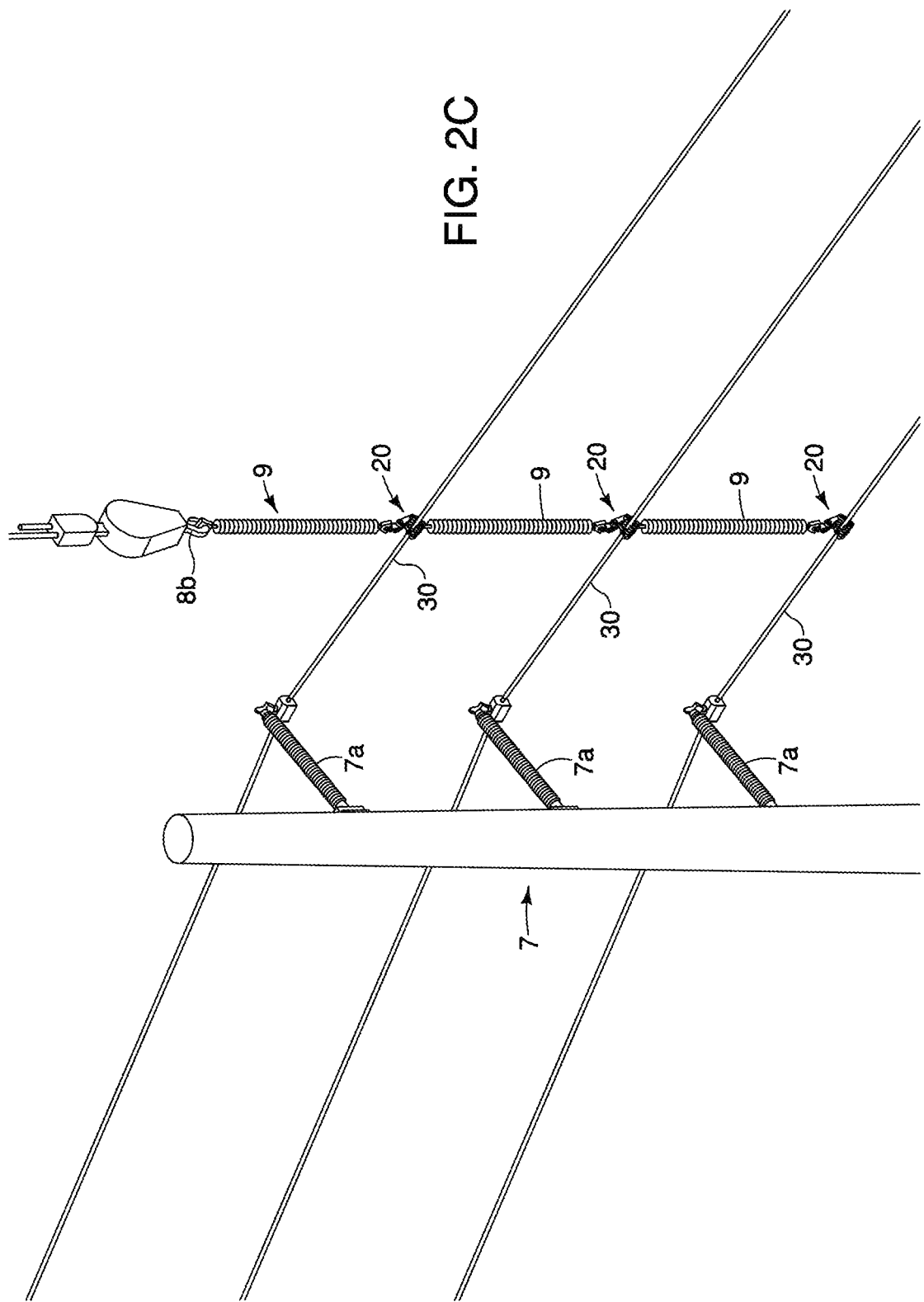

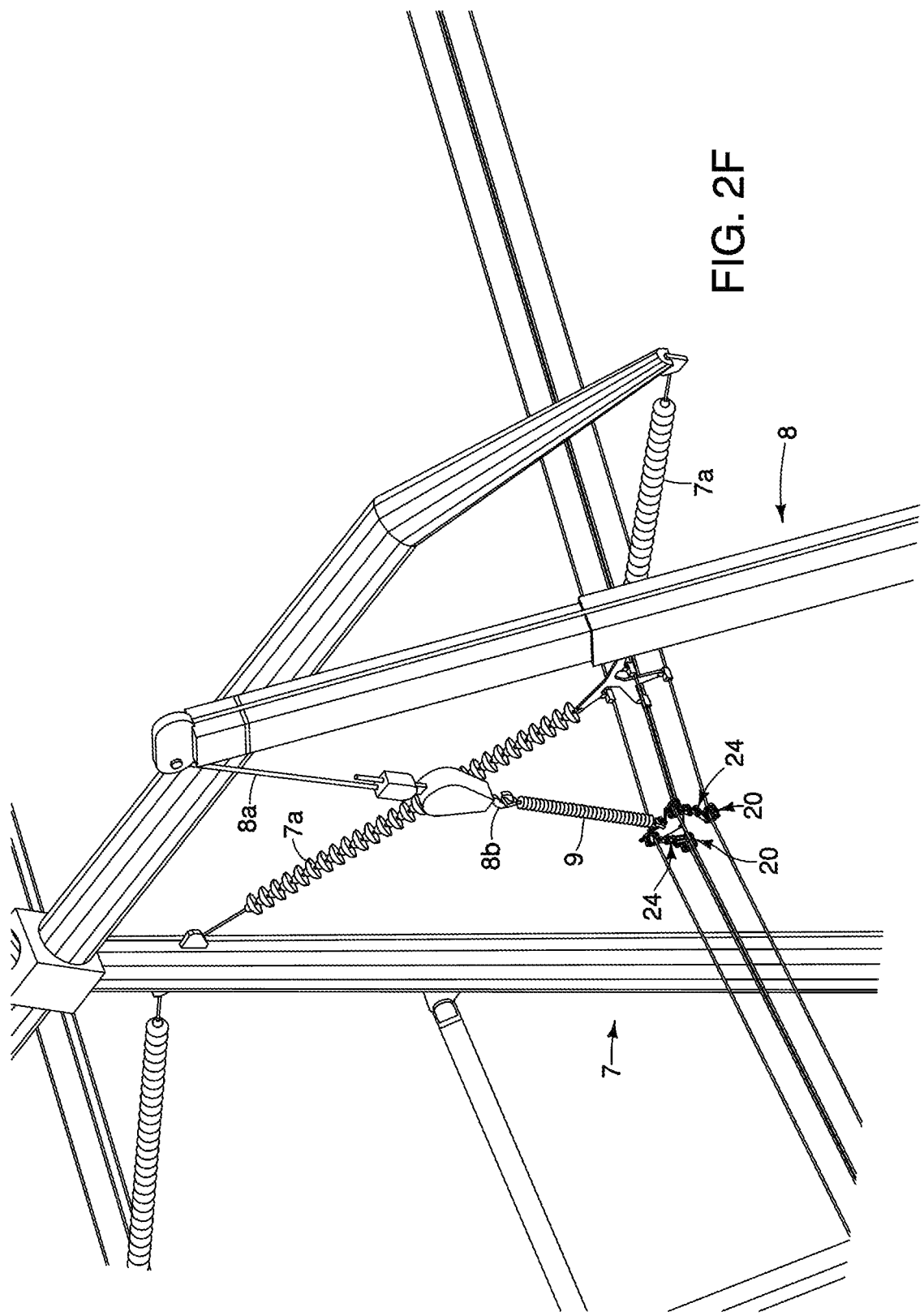

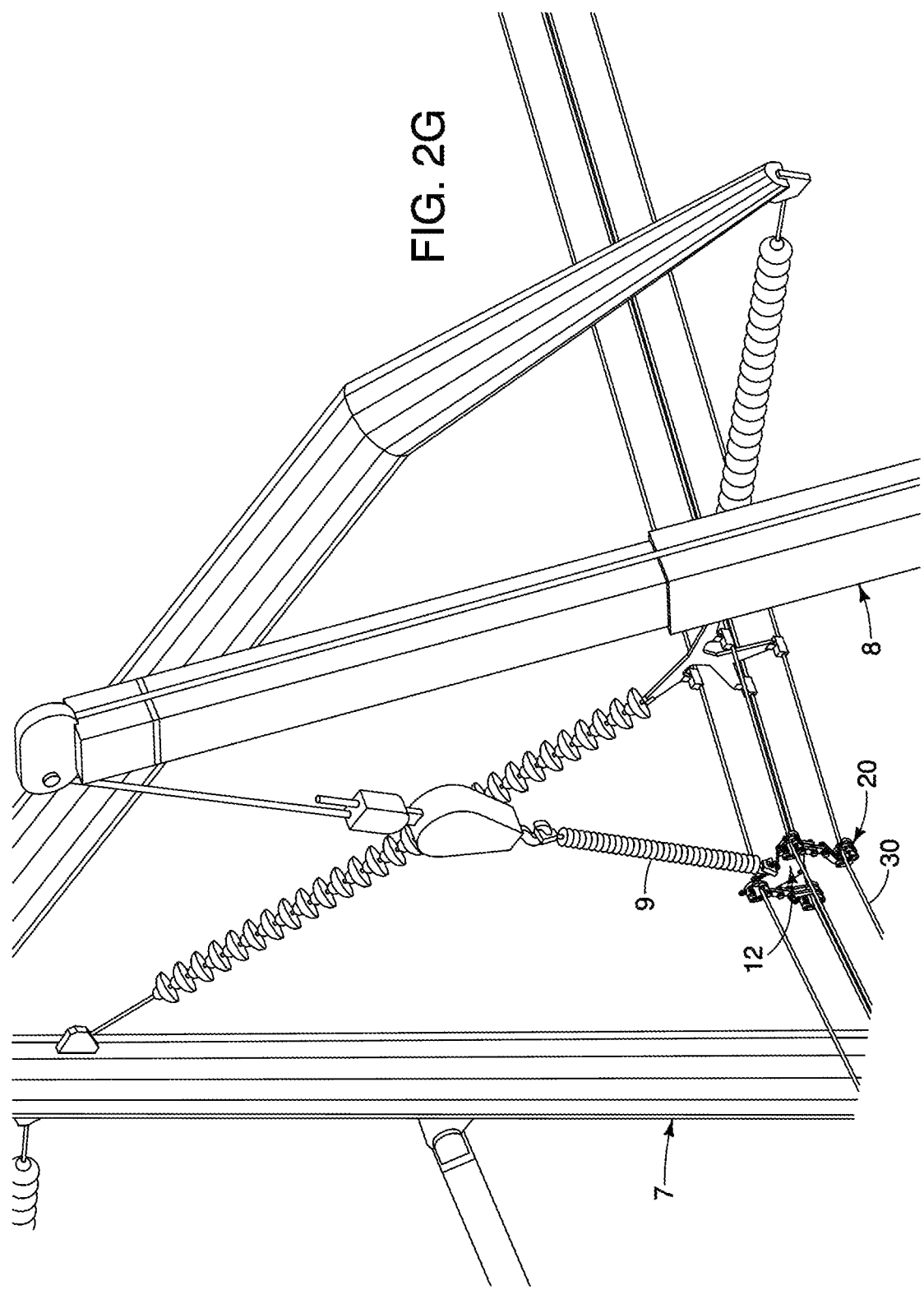

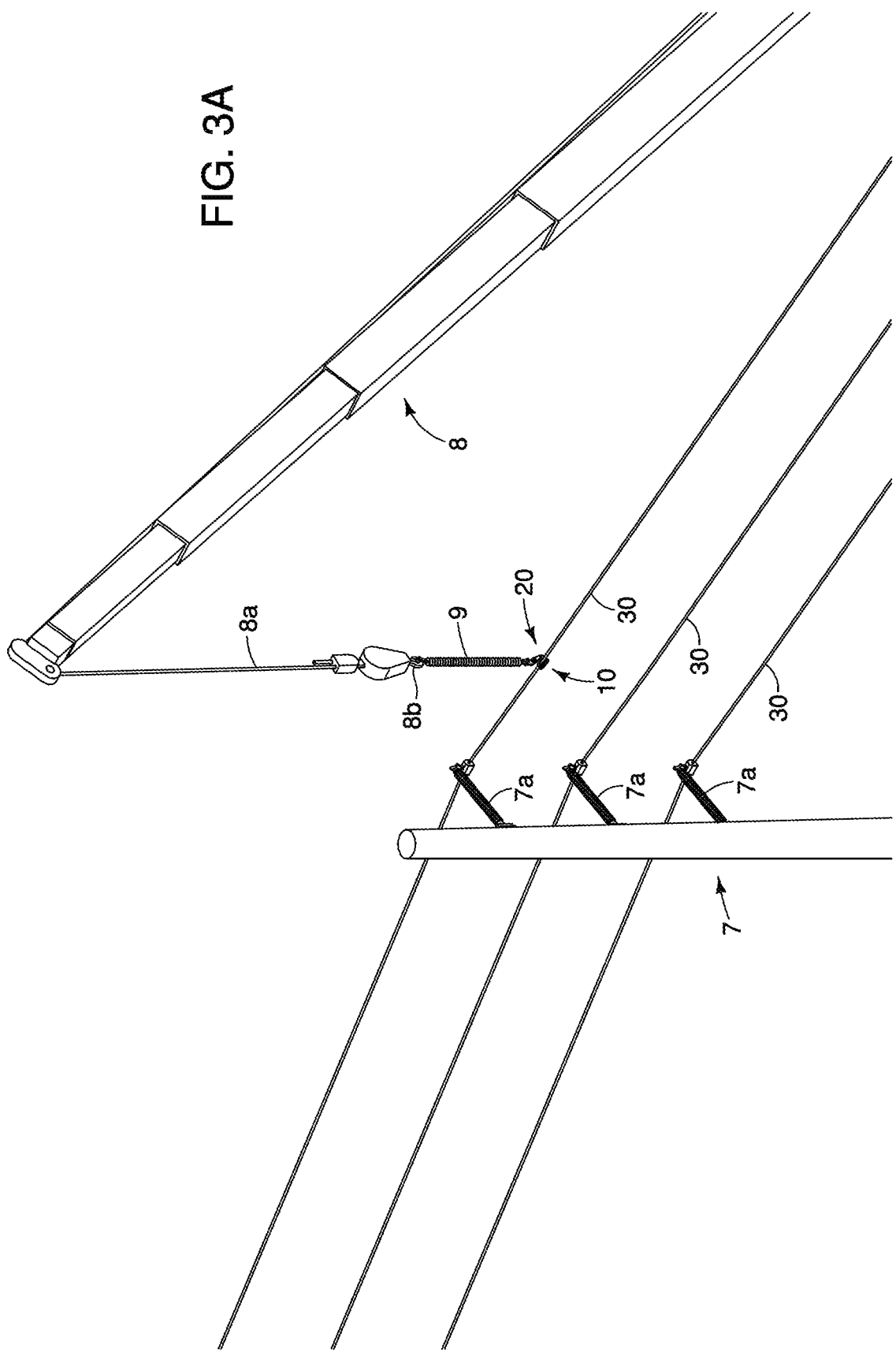

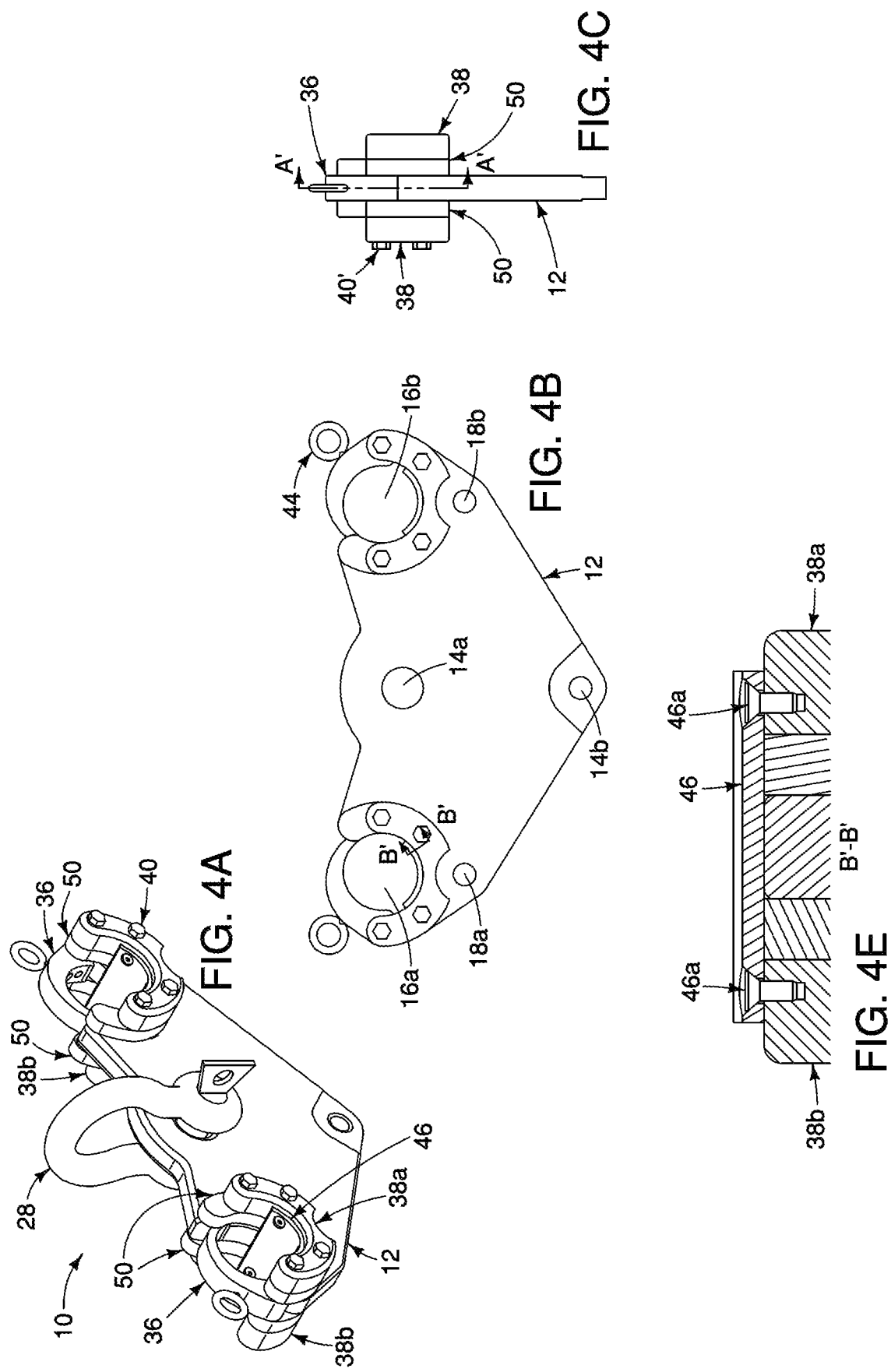

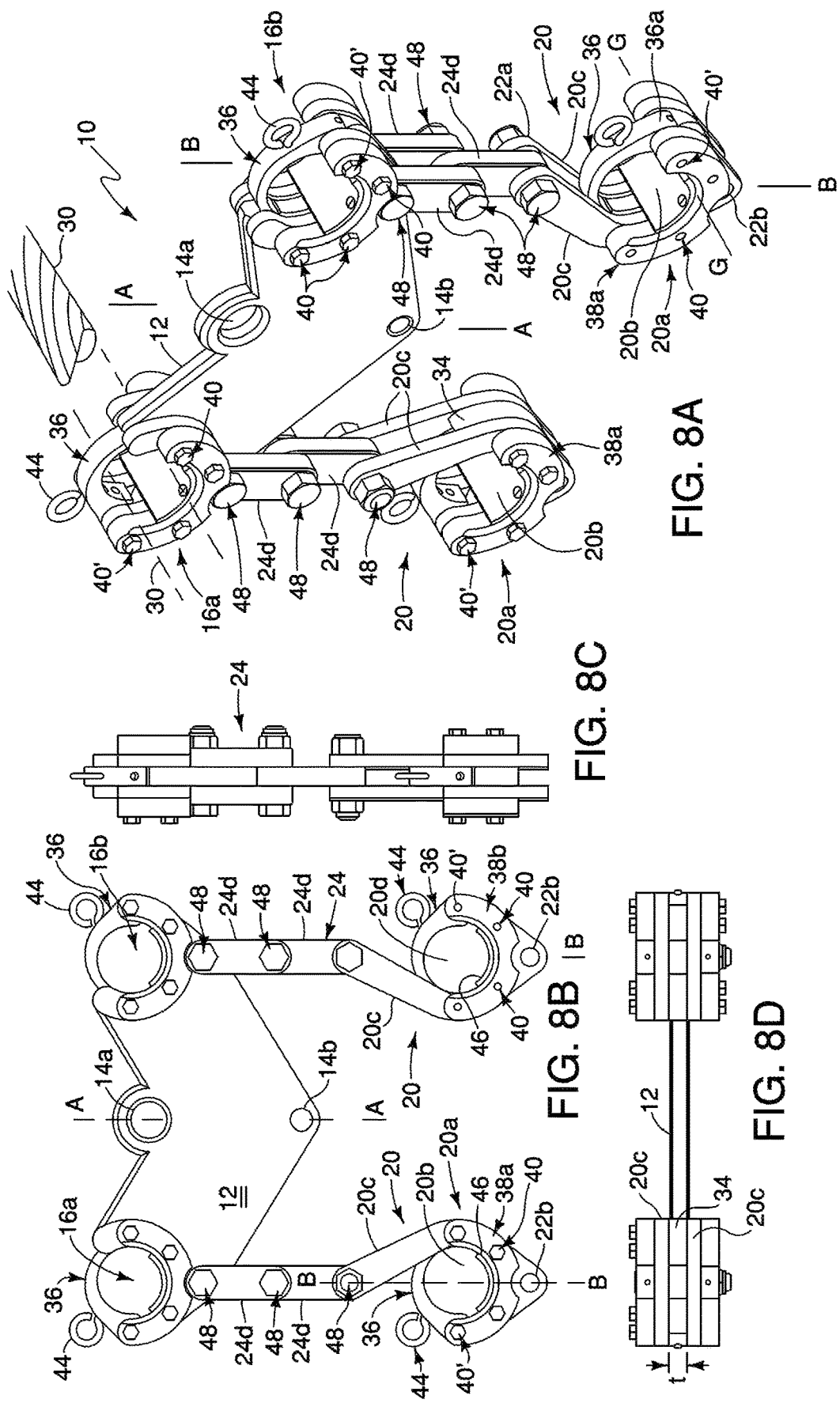

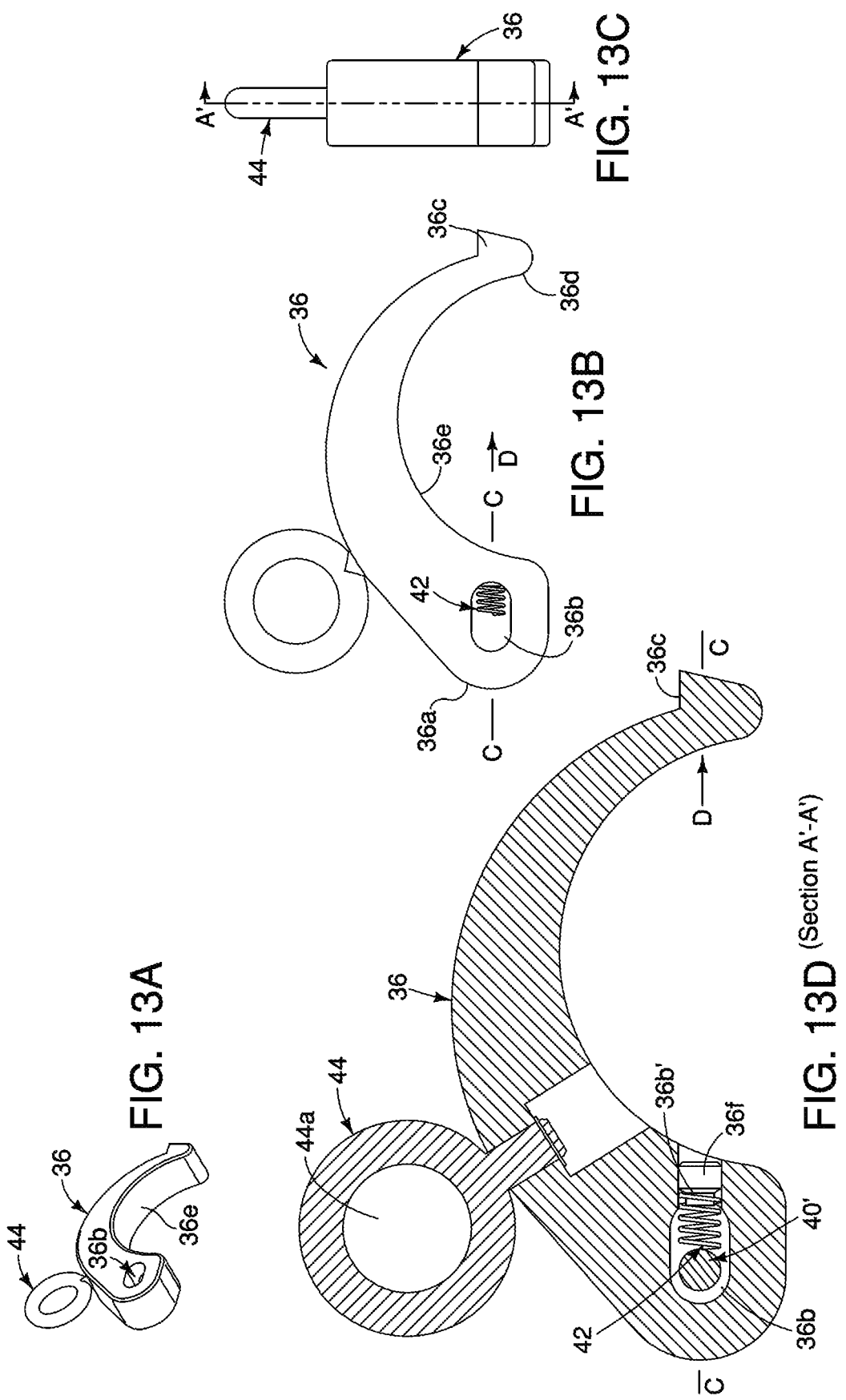

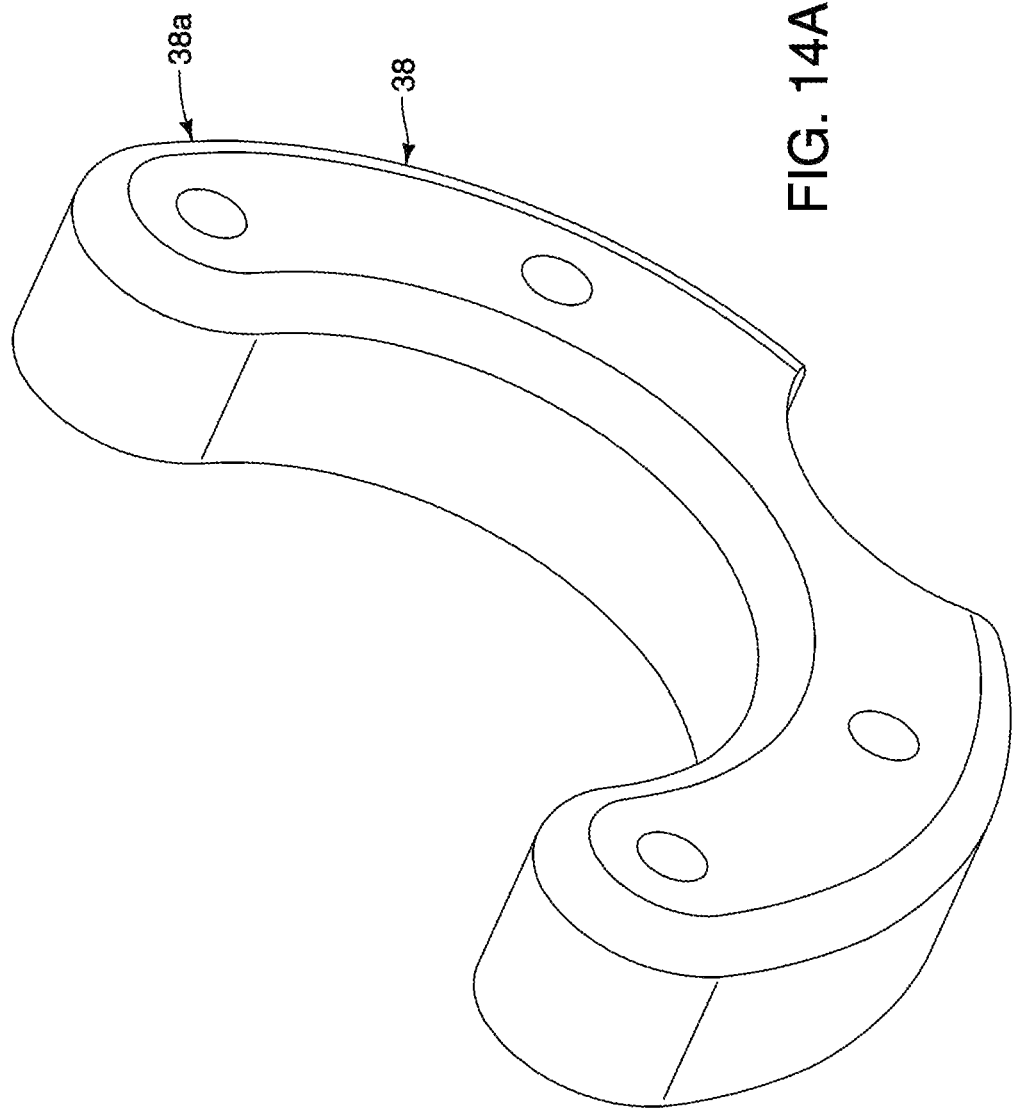

APPARATUS AND METHOD FOR TEMPORARILY SUSPENDING CONDUCTORS

TECHNICAL FIELD

One aspect of the present disclosure relates to the field of devices and methods for temporarily suspending and supporting powerline conductors or wires, including sub-conductors in a conductor bundle, and in particular to a set of components which, once modularly assembled, provides for simultaneously suspending different arrangements of single or multiple sub-conductors in proximity to one another.

BACKGROUND

High voltage transmission and distribution lines are typically strung between a series of spaced-apart support structures such as towers or poles. The conductors or wires are connected to insulators mounted on the towers or poles. Periodically it is necessary to replace or repair components on the towers or poles, such as cross arms and insulators or the support structure itself, to maintain the electrical circuit in good working order. It is preferable if this maintenance and repair work, referred to as hot line work, can be performed without de-energizing the conductors in order to avoid, for example, an interruption of service. Hot line work is a potentially hazardous undertaking. Safety regulations require that linemen maintain minimum work clearances or "limit of approach distance" from energized conductors. The limit of approach distance varies depending upon the voltage of the conductors. The higher the voltage, the larger the limit of approach distance required.

As described in U.S. Pat. No. 7,535,132, alternating current is generated in a three-phase configuration. The three phases, A phase, B phase and C phase, are all transported over separate conductors, cables or wires. Each such separate single conductor may be referred to in the industry as a phase. It is appreciated by one skilled in the art, that in some systems, more than one conductor, referred to herein as sub-conductors, carry the power load for a particular phase. This may be done in instances when a load is greater than a single conductor can accommodate. In such cases, multiple, so-called bundled, sub-conductors are often located adjacent to one another and may hang from the same insulator. The sub-conductors may be separated by spacers. Insulators may be configured to carry for example double sub-conductors, two sub-conductors per phase, under a yoke plate attached to the insulator or insulators. Conductor bundles may have two, three, four, five or six or more sub-conductors per bundle.

A manipulator for manipulating multiple sub-conductors in a single phase conductor bundle is described in U.S. Pat. No. 8,573,562. The manipulator supports the sub-conductors in an energized single-phase conductor bundle and includes a rigid support member and first and second actuators mounted on the support member, wherein each actuator is independently actuable of the other. Insulators are mounted on each actuator. A selectively releasable coupler is mounted on each insulator for selectively releasable coupling of each insulator to a corresponding sub-conductor. The actuators extend corresponding insulators independently of one another from the support member to thereby separate from each other, by an optimized separation distance, the distal ends of each insulator.

PCT/US2021/022141, filed Mar. 12, 2021, and published as WO 2021/183906 on Sep. 16, 2021 describes a bundle lifter for supporting sub-conductors in a single conductor bundle.

As seen in FIG. 1, it is known in the prior art to support the sub-conductors in a conductor bundle using hooks 2 suspended by cables from a yoke plate 4, such apparatus as supplied for example by Ningbo Huaxiang Dongfang Machinery and Tools of Power Co., Ltd., Zhejiang, China (www.nbdf-stringingequipments.com).

SUMMARY

Accordingly, in one aspect, a set of components for assembling a temporary wire suspender for temporarily suspending or supporting a plurality of energized or de-energized conductors or sub-conductors, separated from each other by a pre-set clearance, is provided. The set includes a yoke plate having left and right yoke plate conductor cradles. The yoke plate also includes an engagement structure for carrying, along a centroidal vertical axis of the yoke plate, the loading from the weight of the sub-conductors. The engagement structure may preferably be upper and lower suspension apertures formed in the yoke plate and the set also includes a plurality of J-hook assemblies. Each J-hook assembly has a corresponding conductor cradle and a corresponding J-hook engagement structure, for carrying, along a centroidal vertical axis of the J-hook, the loading from the weight of the corresponding conductor or sub-conductor. The set further comprises a plurality of elongate linkage members. Each linkage member has a corresponding engagement structure. The set also comprises a plurality of removable couplers adapted to releasably, selectively and mechanically couple the yoke plate, the plurality of J-hook assemblies, and the plurality of linkage members through their corresponding engagement structures into multiple wire suspender assembled combinations to temporarily suspend or support the plurality of energized or de-energized conductors or sub-conductors. The assembled combinations is an assembled combination chosen from the group comprising: (a) a two sub-conductor horizontally disposed wire suspender comprising the yoke plate, and wherein first and second sub-conductors of the plurality of sub-conductors are supported in the left and right yoke plate conductor cradles, separated by the pre-set clearance, (b) a two sub-conductor vertically disposed wire suspender comprising first and second J-hook assemblies of the plurality of J-hook assemblies coupled vertically one above the other through at least one linkage member of the plurality of linkage members, and wherein first and second sub-conductors of the plurality of sub-conductors are suspended in conductor cradles of the first and second J-hook assemblies, separated by the pre-set clearance, (c) a three conductor vertically disposed wire suspender comprising first, second and third J-hook assemblies of the plurality of J-hook assemblies coupled vertically one above the other through the plurality of linkage members, and wherein first, second and third conductors of the plurality of conductors are suspended in conductor cradles of the first, second and third J-hook assemblies, separated from each other by the pre-set clearance, (d) a two up, one down three sub-conductor wire suspender comprising the yoke plate and a J-hook assembly of the plurality of J-hook assemblies coupled to a bottom end of the yoke plate through at least one linkage member of the plurality of linkage members, and wherein first and second sub-conductors of the plurality of sub-conductors are supported in the left and right yoke plate conductor cradles and a third sub-conductor of the plurality of sub-conductors is suspended in a conductor cradle of the J-hook assembly, separated from each other by the pre-set clearance, (e) a one up, two down three sub-conductor wire suspender comprising a J-hook assembly of the plurality of J-hook assemblies and the yoke plate coupled to a bottom end of the J-hook assembly through at least one linkage member of the plurality of linkage members, and wherein a first sub-conductor of the plurality of sub-conductors is suspended in a conductor cradle of the J-hook assembly and second and third sub-conductors of the plurality of sub-conductors are supported in the left and right yoke plate conductor cradles, separated from each other by the pre-set clearance, or (f) a four sub-conductor wire suspender comprising the yoke plate and first and second J-hook assemblies of the plurality of J-hook assemblies coupled to ends of the yoke plate through the plurality of linkage members such that the first and second J-hook assemblies depend downwardly from the yoke plate, and wherein first and second sub-conductors of the plurality of sub-conductors are supported in the left and right yoke plate conductor cradles and third and fourth sub-conductors of the plurality of sub-conductors are suspended in corresponding conductor cradles of the first and second J-hook assemblies, separated from each other by the pre-set clearance.

In another aspect, a method for temporarily suspending or supporting a plurality of energized or de-energized conductors or sub-conductors, separated from each other by a pre-set clearance is provided. The method comprises providing the set of components described above. The method further comprises assembling a temporary wire suspender having one of the assembled combinations described above. The temporary wire suspender comprises a plurality of conductor cradles. The method further comprises moving the plurality of energized or de-energized conductors or sub-conductors from their primary location. Finally, the method comprises locating the plurality of energized or de-energized conductors or sub-conductors in the plurality of the conductor cradles such that a weight of the plurality of energized or de-energized conductors or sub-conductors is suspended or supported by the temporary wire suspender, and the plurality of energized or de-energized conductors or sub-conductors are secured in the temporary wire suspender and are separated from each other by the pre-set clearance.

In another aspect, a set of components for assembling a temporary wire suspender for temporarily supporting a plurality of energized or de-energized conductors or sub-conductors is provided. The set comprises a yoke plate having: first and second, correspondingly upper and lower, suspension apertures formed therein along a centroidally located vertical axis of symmetry of the yoke plate. The yoke plate further comprises oppositely disposed left and right yoke plate conductor cradles formed in the yoke plate and symmetrically spaced apart in the yoke plate from the vertical axis of symmetry of the yoke plate, and third and fourth suspension apertures formed in the yoke plate below the left and right yoke plate conductor cradles respectively. The set also comprises a plurality of J-hook assemblies. Each J-hook assembly of the plurality of J-hook assemblies has a hook so as to form a corresponding conductor cradle at a lower end thereof and has fifth and sixth, correspondingly upper and lower, suspension apertures formed therein respectively above and below the J-hook assembly conductor cradle along a centroidal vertical axis of the J-hook assembly. The set also comprises a plurality of elongate linkage members. Each linkage member of the plurality of linkage members has seventh and eighth suspension apertures formed therein at opposite ends thereof. The set finally comprises a plurality of removable couplers which are adapted to releasably couple the yoke plate, the plurality of J-hook assemblies, and the plurality of elongate linkage members, using, respectively, the corresponding second, third, fourth, fifth, sixth, seventh and eighth suspension apertures into multiple wire suspender assembled combinations to temporarily support the plurality of conductors or sub-conductors. The assembled combinations is chosen from the group of assembled combinations comprising: (a) a two sub-conductor horizontally disposed wire suspender, wherein first and second sub-conductors of the plurality of sub-conductors are supported in the left and right yoke plate conductor cradles, (b) a two sub-conductor vertically disposed wire suspender, wherein first and second sub-conductors of the plurality of sub-conductors are suspended in the conductor cradles of first and second J-hook assemblies of the plurality of J-hook assemblies coupled vertically one above the other, either to each other or with at least one intervening linkage member of the plurality of elongate linkage members therebetween, (c) a three conductor vertically disposed wire suspender, wherein first, second and third conductors of the plurality of conductors are suspended in the conductor cradles of first, second and third J-hook assemblies of the plurality of J-hook assemblies coupled vertically one above the other through the plurality of elongate linkage members, (d) a two up, one down three sub-conductor wire suspender wherein first and second sub-conductors of the plurality of sub-conductors are supported in the left and right yoke plate conductor cradles and wherein a third sub-conductor of the plurality of sub-conductors is suspended in a J-hook assembly of the plurality of J-hook assemblies coupled by its fifth suspension aperture to the second suspension aperture in the yoke plate, (e) a one up, two down three sub-conductor wire suspender wherein a first sub-conductor of the plurality of sub-conductors is supported in a J-hook assembly of the plurality of J-hook assemblies coupled by its sixth suspension aperture with at least one intervening linkage member of the plurality of elongate linkage members therebetween first suspension aperture in the yoke plate, and wherein second and third sub-conductors of the plurality of sub-conductors are supported in the left and right yoke plate conductor cradles, or (f) a four sub-conductor wire suspender wherein first and second sub-conductors of the plurality of sub-conductors are supported in the left and right yoke plate conductor cradles, and wherein third and fourth sub-conductors of the plurality of sub-conductors are suspended in first and second J-hook assemblies of the plurality of J-hook assemblies coupled by their fifth suspension apertures to the third and fourth suspension apertures in the yoke plate by intervening linkage members, the seventh suspension apertures of the intervening linkage members coupled to the third and fourth suspension apertures of the yoke plate, the eighth suspension apertures of the intervening linkage members coupled to the fifth suspension apertures of the first and second J-hook assemblies.

In another aspect, a single wire conductor wire suspender comprising a J-hook assembly of the plurality of J-hook assemblies coupled vertically to a top link, and wherein first conductor is suspended in the conductor cradle of the J-hook assembly.

BRIEF DESCRIPTION OF THE DRAWINGS

With reference to the drawings:

FIG. 2A depicts, in perspective view, a side-by-side horizontal double sub-conductor bundle being hoisted so as to be temporarily supported in a horizontal two bundle wire suspender assembly according to the present disclosure;

FIG. 2C depicts, in perspective view, three vertically aligned phases being hoisted and suspended in three corresponding single wire suspender J-hooks according to the present disclosure;

FIG. 2F depicts, in perspective view, a four sub-conductor bundle being hoisted and supported and suspended in a four bundle wire suspender according to the present disclosure;

FIG. 2G is an enlarged view of the view of FIG. 2F;

FIG. 3A depicts, in perspective view, the single wire suspender J-hook assembly of FIG. 3 in use, suspending a single conductor as it is hoisted by a crane;

FIG. 4A is, in perspective view, a horizontal two bundle wire suspender according to the present disclosure for supporting two sub-conductors in a horizontally disposed configuration;

FIG. 4B is, in front elevation view, the horizontal two bundle wire suspender of FIG. 4A;

FIG. 4C is, in side elevation view, the horizontal two bundle wire suspender of FIG. 4A;

FIG. 4E is a sectional view, showing attachment of a liner along line B'-B' in FIG. 4B;

FIG. 8A is, in perspective view, a four bundle wire suspender according to the present disclosure for supporting and suspending four sub-conductors;

FIG. 8B is, in front elevation view, the four bundle wire suspender of FIG. 8A

FIG. 8C is, in side elevation view, the four bundle wire suspender of FIG. 8A;

FIG. 8D is, in bottom view, the four bundle wire suspender of FIG. 8A;

FIG. 13A is, in perspective view, a latch member of the latch assembly and a hot stick eye bolt of the temporary wire suspender according to the present disclosure;

FIG. 13B is, in front elevation view, the latch member and hot stick eye bolt of FIG. 13A;

FIG. 13C is, in side elevation view, the latch member and hot stick eye bolt of FIG. 13A;

FIG. 13D is a sectional view along line A'-A' in FIG. 13C;

FIG. 14A is, in perspective view, a bolt side outside clamp plate of the temporary wire suspender according to the present disclosure;

DETAILED DESCRIPTION

An apparatus according to one aspect of the present disclosure, for temporarily supporting and suspending conductors or multiple, spaced apart sub-conductors of a conductor bundle, may be assembled using a set or kit of components matched to one another for interchangeability of components so that a lineman may quickly and easily tailor and construct a temporary wire suspender to match the immediate needs of a job such as to temporarily simultaneously support or suspend a single conductor or two, three, four, six, eight, etc. spaced-apart sub-conductors of a conductor bundle. The set or kit (collectively herein a set) of components may be regarded as a set of components for assembling a temporary wire suspender for suspending and supporting multiple conductors or multiple, spaced-apart sub-conductors, which includes in the set a yoke plate, a plurality of J-hook assemblies, a plurality of linkage members, and a plurality of removable fasteners, all as better described below. As used herein, support or suspend have been used interchangeably to define conductors or sub-conductors supported by the yoke plate, or conductors or sub-conductors suspended in the J-hook assemblies.

Figure 9:
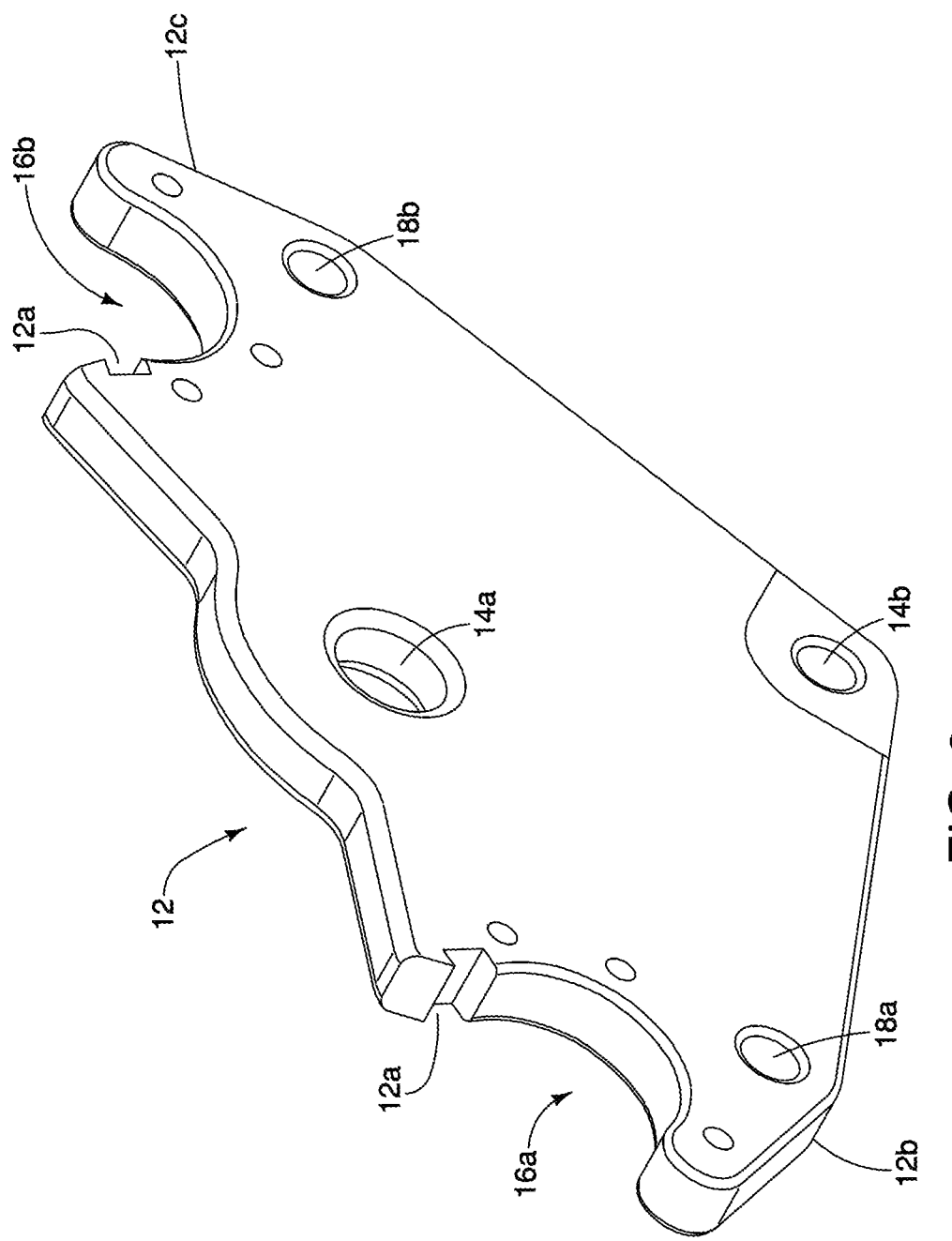
FIG. 9 is, in perspective view, a yoke plate of the temporary wire suspender according to the present disclosure.

As seen in the figures, wherein like reference numerals denote corresponding parts in each view, the set of components for the assembly of a wire suspender 10 includes a yoke plate 12. Yoke plate 12 has an engagement structure such as upper and lower suspension apertures 14a and 14b shown in FIG. 9, (alternatively referred to herein as first and second suspension apertures) formed therein along a centroidally located vertical axis of symmetry A. Oppositely disposed left and right yoke plate conductor cradles 16a and 16b are formed in yoke plate 12 and are symmetrically spaced apart in the yoke plate from the vertical axis of symmetry A. Third and fourth suspension apertures 18a and 18b (FIG. 9) are formed in yoke plate 12 below left and right yoke plate conductor cradles 16a,16b respectively.

The set of components for the assembly of the wire suspender 10 also includes a plurality of J-hook assemblies 20. Each J-hook assembly 20 has a hook 20a at a lower end thereof so as to form a corresponding conductor cradle 20b at a lower end of hook 20a. Further, each J-hook assembly has a corresponding engagement structure such as upper and lower suspension apertures 22a and 22b shown in FIG. 8A, (alternatively referred to herein as fifth and sixth suspension apertures). The upper and lower suspension apertures are formed in J-hook assembly 20 respectively above and below the conductor cradle 20b along the centroidal vertical axis B of J-hook assembly 20. Preferably hooks 20a are selectively releasably closed by latches, better described below which assist in providing positive control of the supported or suspended conductors such that the conductors may be moved to positions allowing linemen their required minimum approach distance when repairing or replacing insulators or the like, while minimizing the possibility that a conductor suspended in the J-hook assembly 20 may fall out of its supporting hook 20a.

Figure 11A:
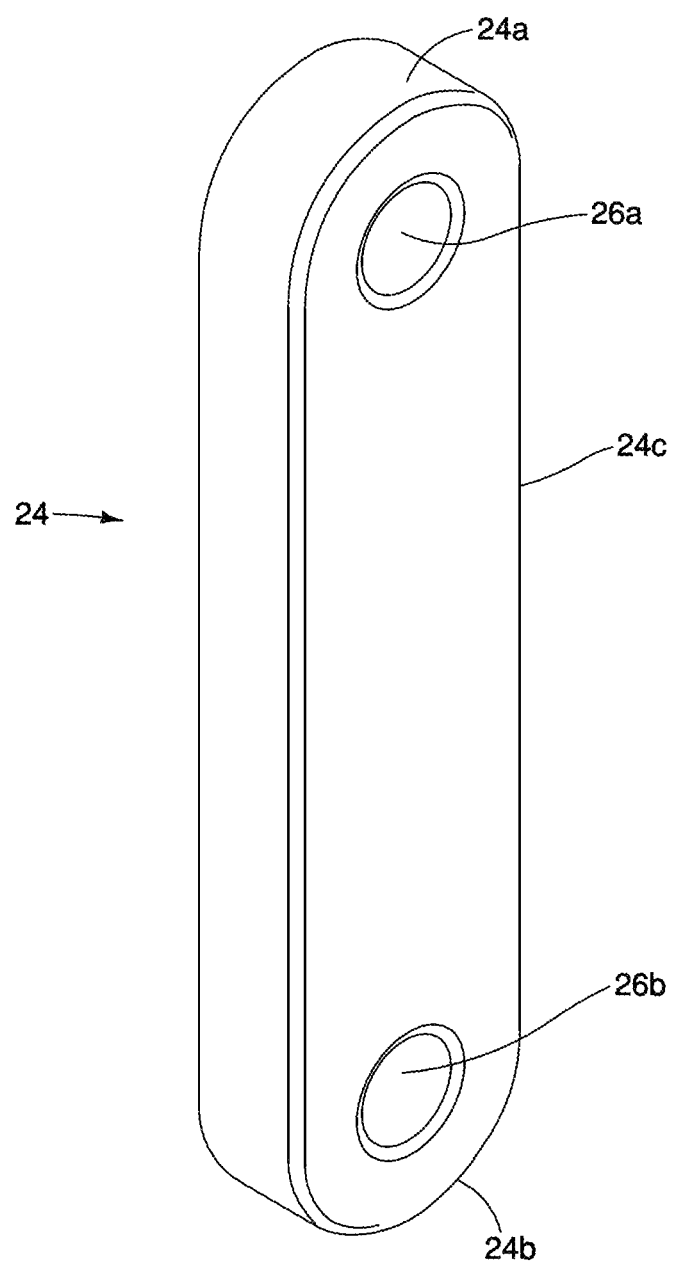
FIG. 11A is, in perspective view, a long linkage member of the temporary wire suspender according to the present disclosure.
Figure 11B:
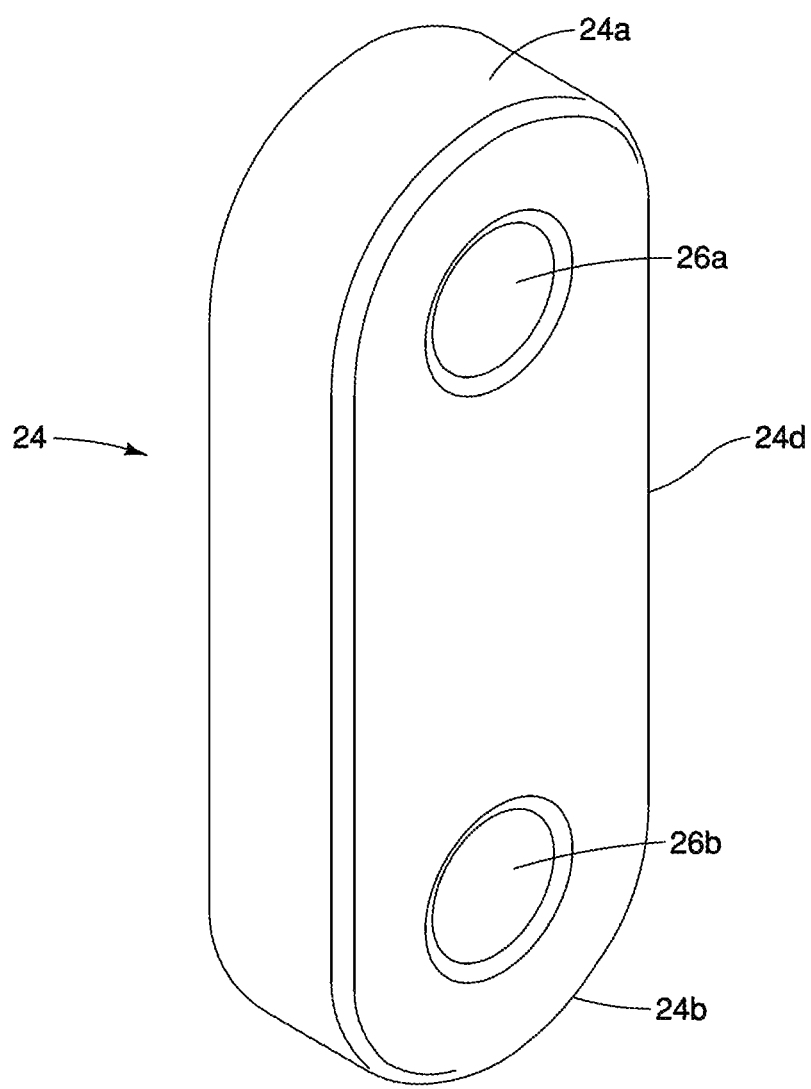
FIG. 11B is, in perspective view, a short linkage member of the temporary wire suspender according to the present disclosure.
Figure 12:
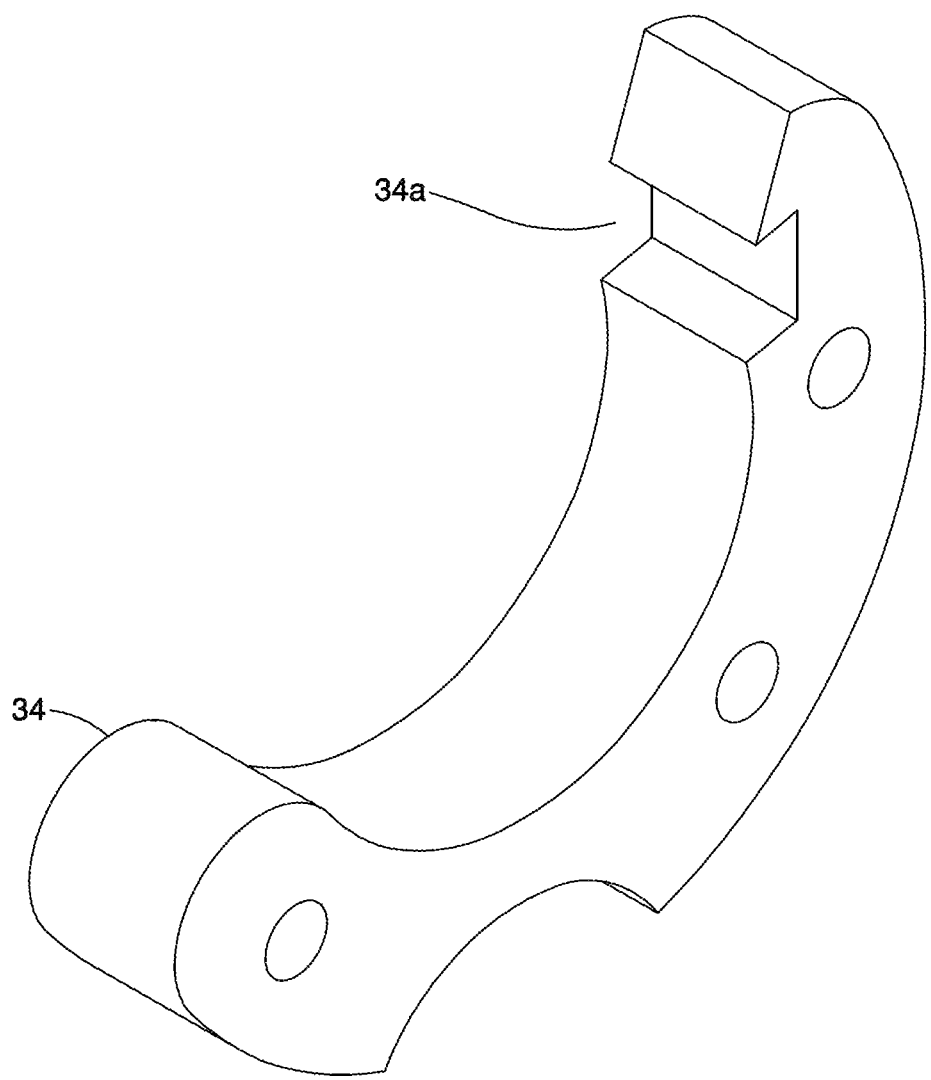
FIG. 12 is, in perspective view, a hook of a latch assembly of the temporary wire suspender according to the present disclosure.

The set of components for the assembly of the wire suspender 10 also includes a linkage assembly 24 including, in one embodiment, a plurality of long elongate linkage members 24c and short linkage members 24d (FIG. 11A). Each linkage member 24c and 24d has corresponding engagement structures such as seventh and eighth suspension apertures 26a and 26b respectively formed at opposite ends of the linkage members 24c and 24d.

The set of components for the assembly of the wire suspender 10 also includes a plurality of removable couplers, such as fasteners, adapted to releasably, selectively and mechanically couple combinations of the yoke plate 12, the plurality of J-hooks assemblies 20, and the plurality of elongate linkage members 24c and 24d through their corresponding engagement structures into multiple wire suspender assembled combinations to temporarily support and suspend, for example, conductors or two, three or four sub-conductors. In some embodiments, second, third, fourth, fifth, sixth, seventh and eighth suspension apertures of the yoke plate, the J-hook assemblies and the linkage members are selectively, releasably and mechanically fastened into various assembled combinations of the wire suspender desired to meet the immediate job requirements. Examples, not intended to be limiting, of the group of assembled combinations for supporting and suspending conductors or sub-conductors include:

Example 1: for a two sub-conductor horizontally disposed conductor bundle, first and second sub-conductors 30 are supported in the left and right yoke plate conductor cradles 16a,16b in yoke plate 12. FIGS. 4A-4D illustrate a horizontal two bundle wire suspender adapted for this. FIG. 2A shows an example of this arrangement in use, wherein a crane boom 8 is used to pick the two sub-conductors 30 so that they rest in the left and right yoke plate conductor cradles 16a, 16b in yoke plate 12, whereafter the sub-conductors may be temporarily supported and moved away from the pole 7 and its corresponding insulators 7a for repair or maintenance of the insulators or pole. The crane cable 8a and hook 8b are separated and isolated or insulated from the yoke plate by an insulator 9.

Figure 1:
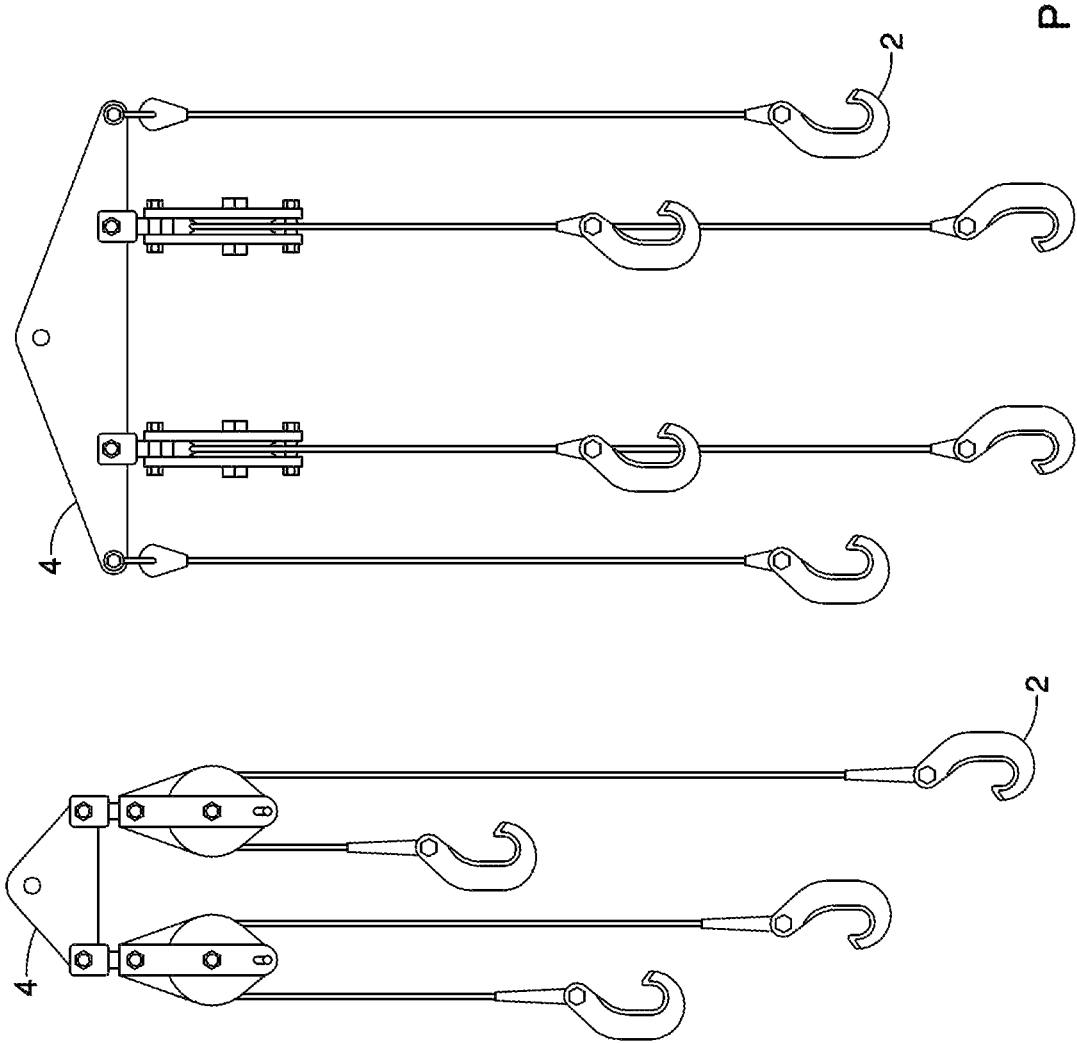
FIG. 1 depicts, in elevation view, two prior art wire suspenders.
Figure 2B:
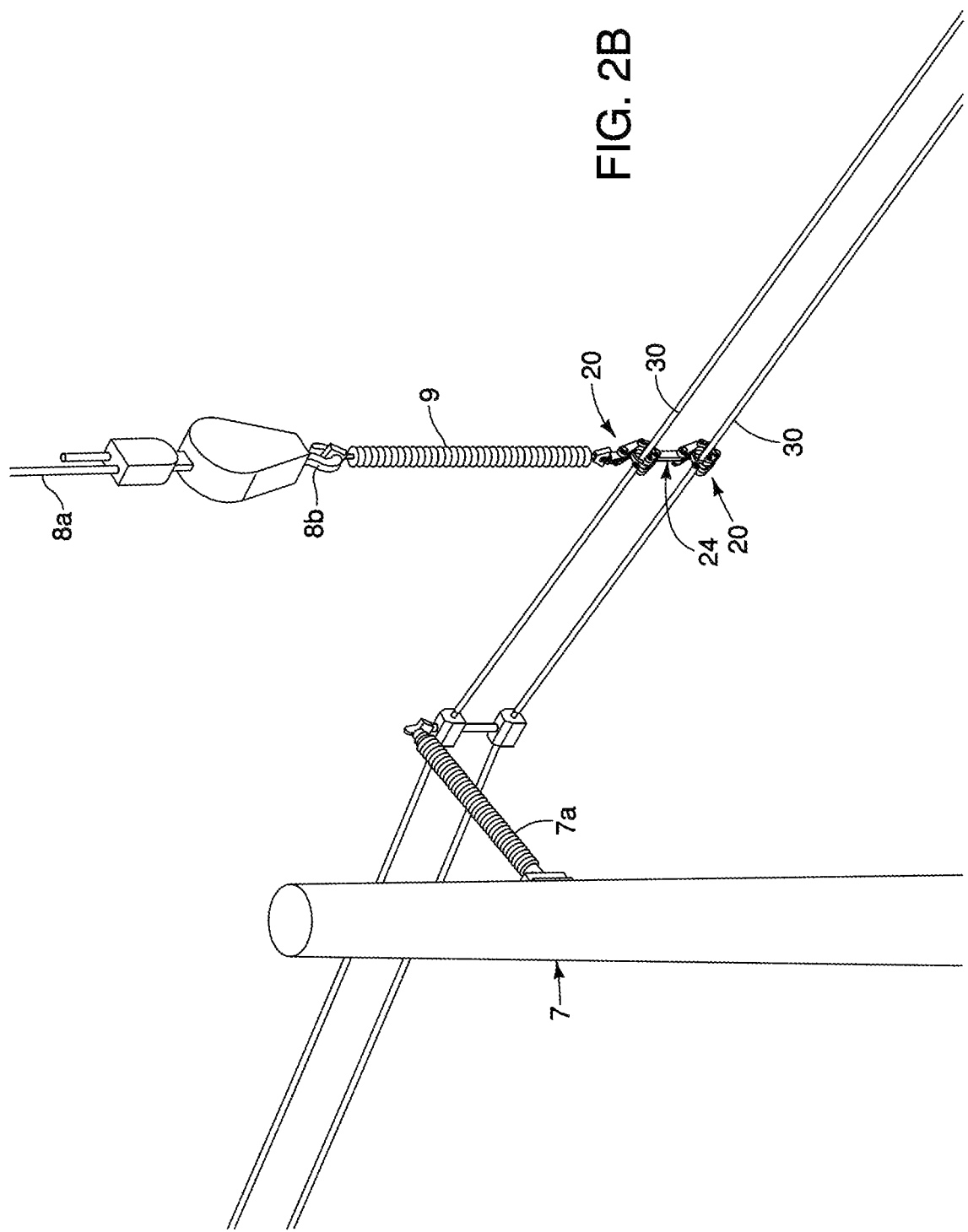
FIG. 2B depicts, in perspective view, a vertical double sub-conductor bundle being hoisted so as to be temporarily suspended in a vertical two bundle wire suspender according to the present disclosure.
Figure 5C:
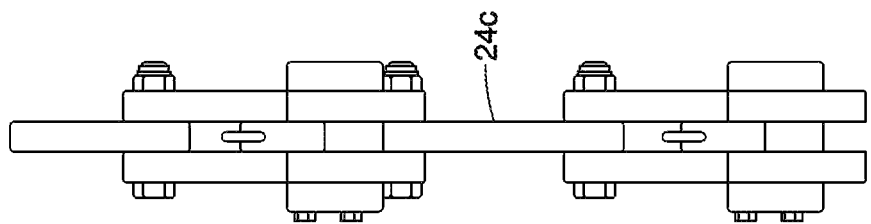
FIG. 5C is, in side elevation view, the vertical two bundle wire suspender of FIG. 5A.
Figure 5B:
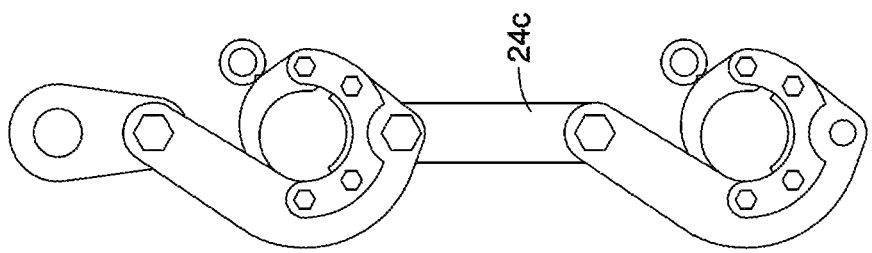
FIG. 5B is, in front elevation view, the vertical two bundle wire suspender of FIG. 5A.
Figure 5A:
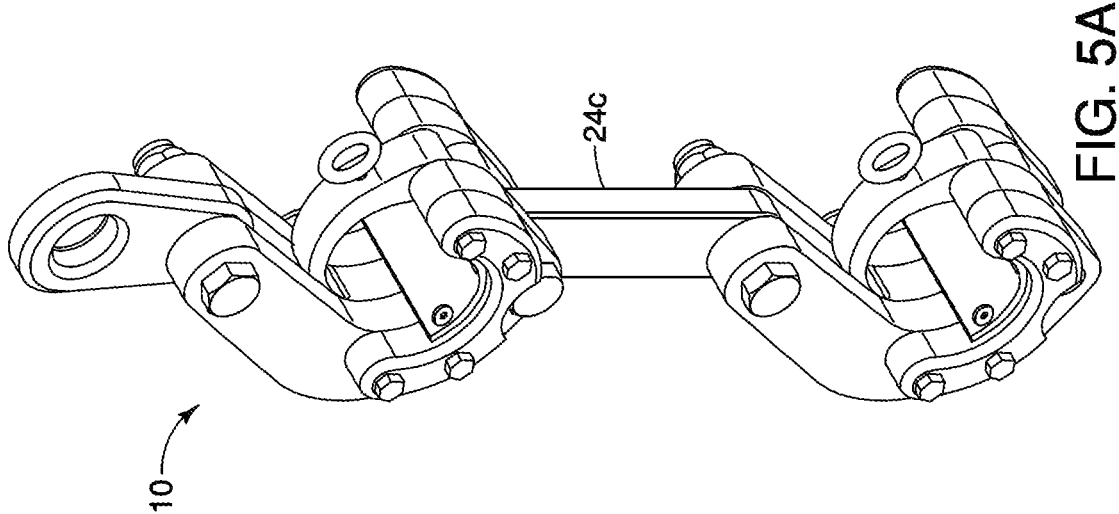
FIG. 5A is, in perspective view, a vertical two bundle wire suspender according to the present disclosure for suspending two sub-conductors in a vertically disposed configuration.

Example 2: for a two sub-conductor vertically disposed conductor bundle, first and second sub-conductors 30 are suspended in the conductor cradles 20b of first and second J-hook assemblies 20 fastened vertically one above the other with at least one intervening linkage member 24c or 24d therebetween. FIGS. 5A to 5C illustrate a vertical two bundle wire suspender adapted for this. This arrangement is shown in use in FIG. 2B. If, as seen in FIG. 2C, instead of two sub-conductors, it is desired to temporarily suspend three vertically aligned conductors, for example where the three conductors are three phases, one end of an insulator 9 is fastened to a first J-hook assembly and a second J-hook assembly 20 is fastened to the other end of the first insulator. A second insulator 9 is fastened at its one end to the second J-hook assembly and at its other end to a third J-hook assembly. In this case, the J-hook assemblies are separated and electrically isolated or insulated by insulators 9 instead of linkage members 24c and 24d. As one skilled in the art will understand, two J-hook assemblies separated by one insulator may be used to suspend two conductors, such as two phase conductors in a DC environment.

Figure 2D:
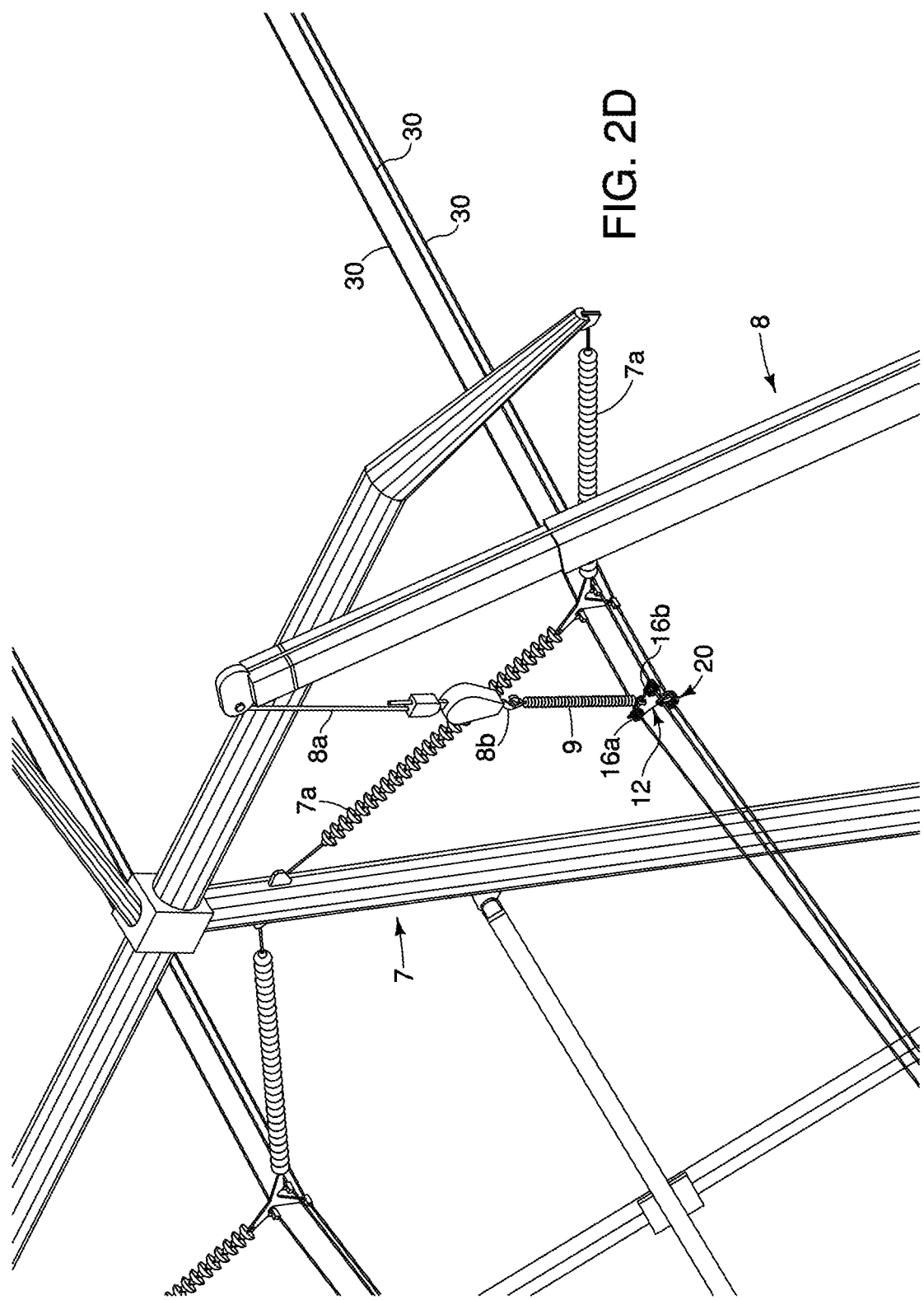
FIG. 2D depicts, in perspective view, a delta configured two up one down three sub-conductor bundle being hoisted in a three bundle wire suspender according to the present disclosure.
Figure 2E:
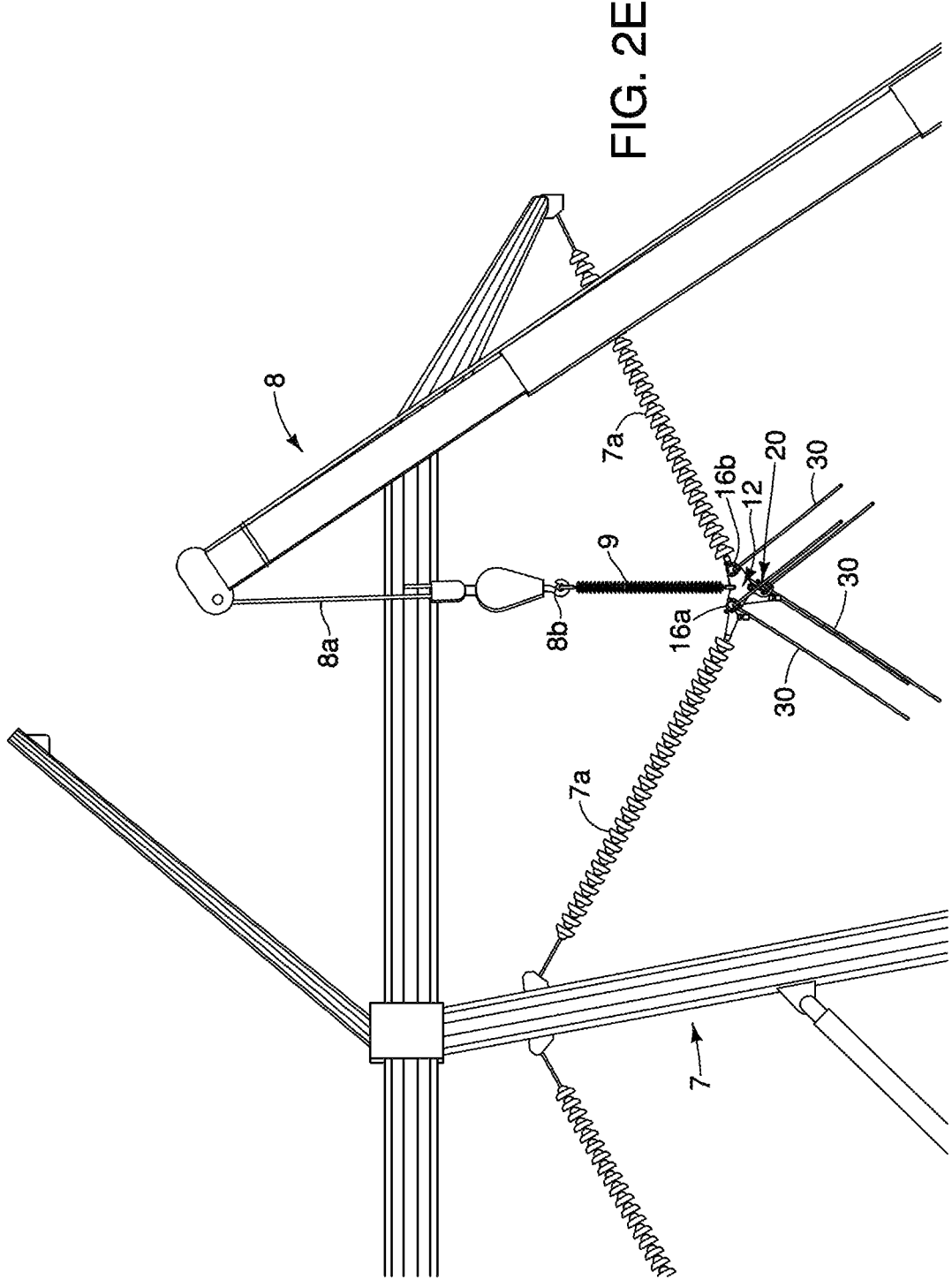
FIG. 2E depicts, in elevation view, the view of FIG. 2D.
Figure 6C:
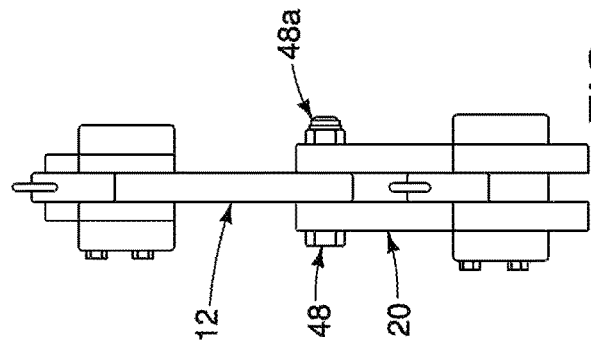
FIG. 6C is, in side elevation view, the three bundle wire suspender of FIG. 6A.
Figure 6B:
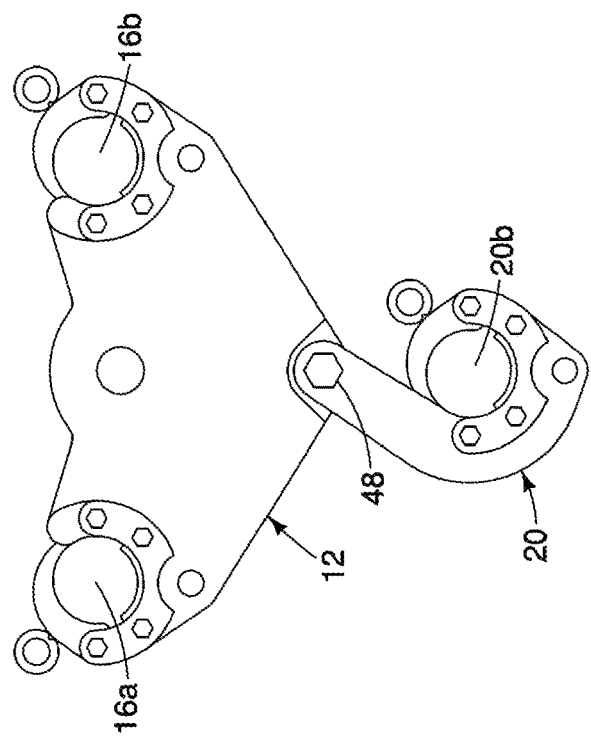
FIG. 6B is, in front elevation view, the three bundle wire suspender of FIG. 6A.
Figure 6A:
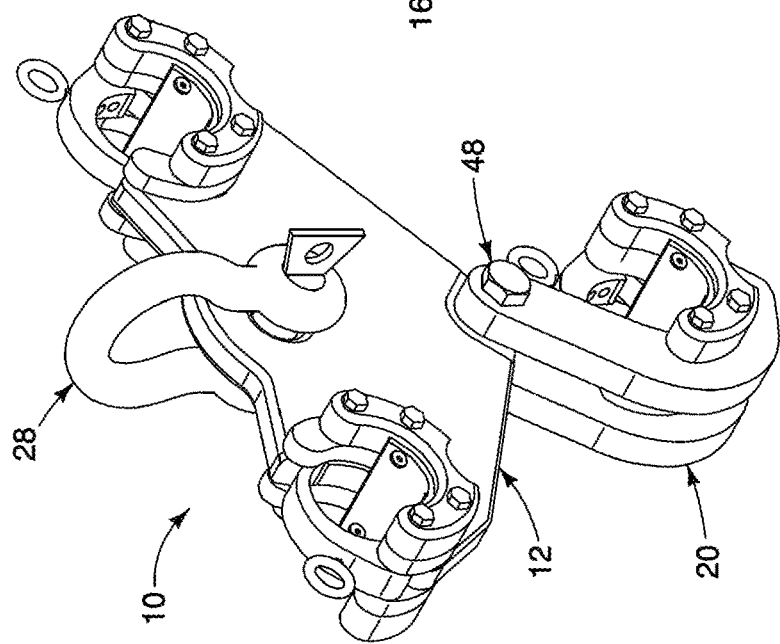
FIG. 6A is, in perspective view, a three bundle wire suspender according to the present disclosure for supporting and suspending three sub-conductors in a two-up, one-down delta configuration.

Example 3: for a two up, one down three sub-conductor bundle, first and second sub-conductors 30 are supported in the left and right yoke plate conductor cradles 16a,16b and a third sub-conductor 30 is suspended in a J-hook assembly 20 fastened by fifth suspension aperture 22a in J-hook assembly 20 to the second suspension aperture 14b in yoke plate 12. FIGS. 6A-6C illustrate a three bundle wire suspender adapted for this. This arrangement is shown in use in FIGS. 2D and 2E. A linkage member 24c or 24d between the yoke plate 12 and J-hook assembly 20 may be used to increase the separation between the upper and lower sub-conductors.

Figure 7A:
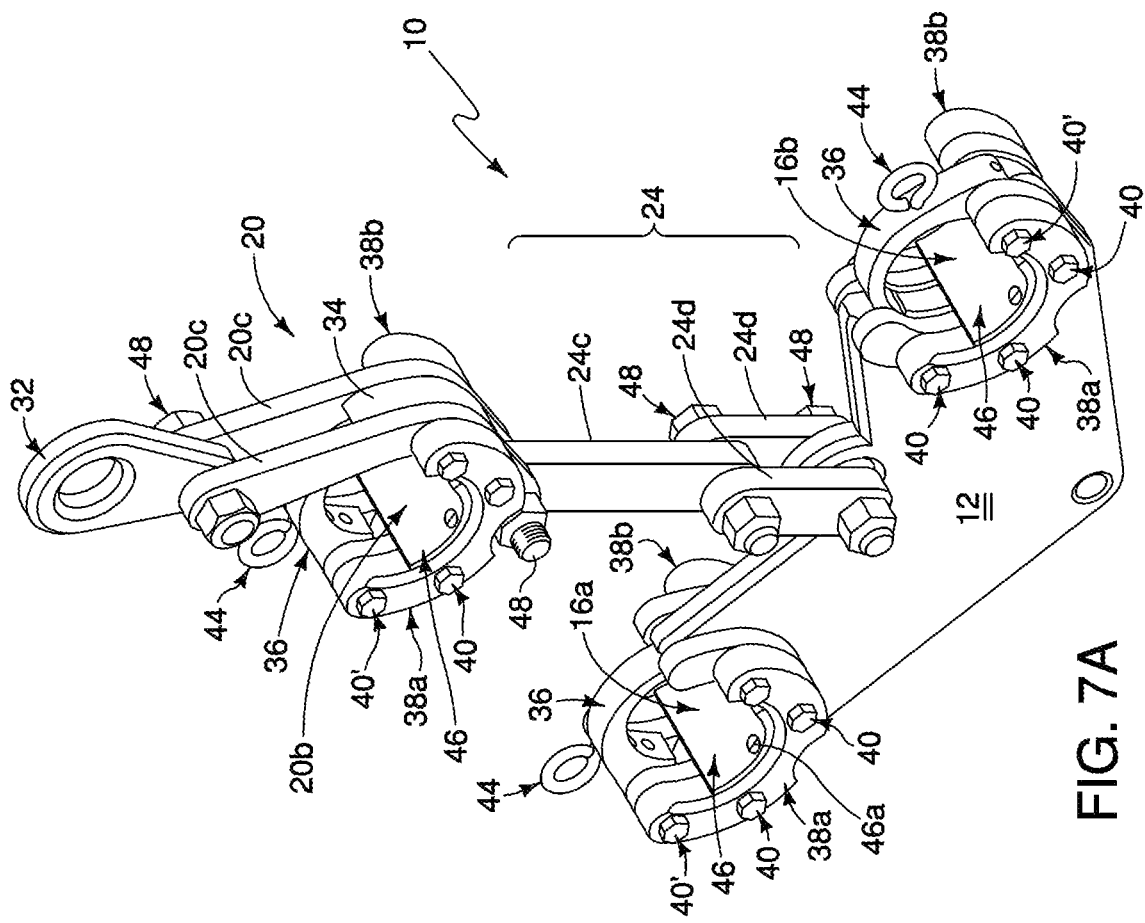
FIG. 7A is, in perspective view, a three bundle wire suspender according to the present disclosure for suspending and supporting three sub-conductors in a one-up, two-down delta configuration.
Figure 7C:
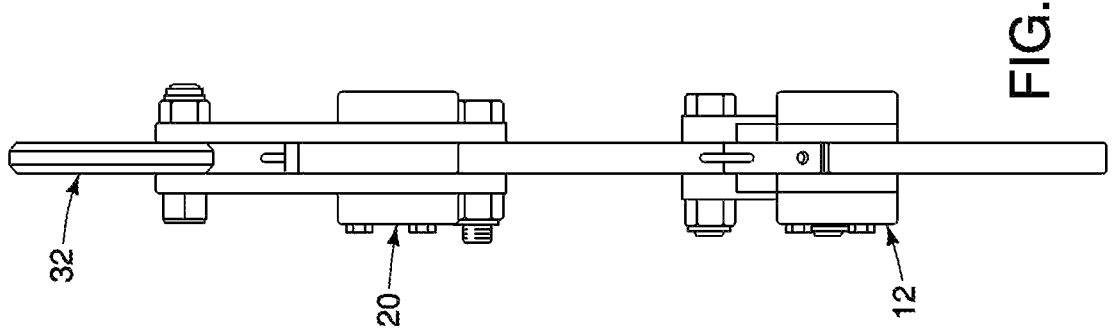
FIG. 7C is, in right side elevation view, the three bundle wire suspender of FIG. 7A.
Figure 7B:
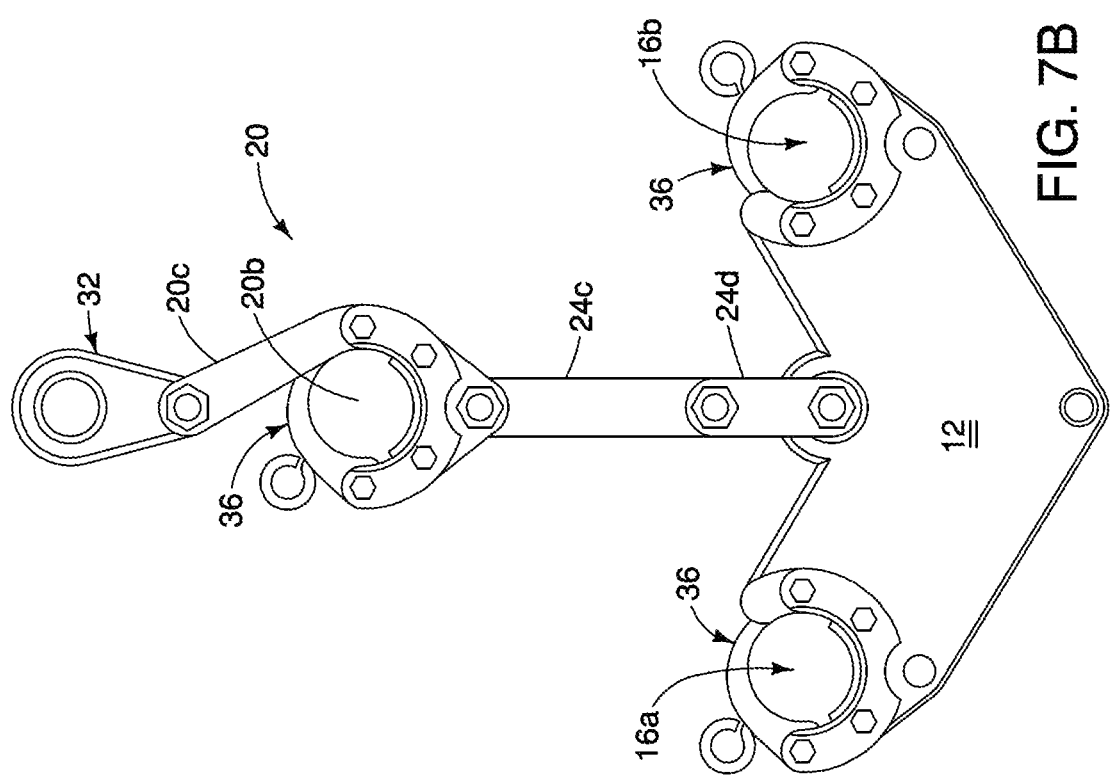
FIG. 7B is, in front elevation view, the three bundle wire suspender of FIG. 7A.

Example 4: for a one up, two down three sub-conductor bundle (FIG. 7A), a first sub-conductor 30 is suspended in a J-hook assembly 20 linked above a yoke plate 12. In particular, a top link 32 is mounted at the upper end of the J-hook assembly in upper suspension aperture 22a and the lower end of the J-hook assembly is fastened by suspension aperture 22b to the upper end of linkage members 24c and 24d, which are themselves fastened at their lower end to upper suspension aperture 14a in yoke plate 12. Second and third sub-conductors are supported in the left and right yoke plate conductor cradles 16a,16b of yoke plate 12. FIGS. 7A to 7C illustrate a three bundle wire suspender adapted for this.

Example 5: for a four sub-conductor bundle, first and second sub-conductors 30 are supported in the left and right yoke plate conductor cradles 16a, 16b. Third and fourth sub-conductors 30 are suspended in first and second J-hook assemblies 20 fastened by their fifth suspension apertures 22a to the third and fourth suspension apertures 18a,18b in yoke plate 12 by intervening linkage members 24c or 24d. The seventh suspension apertures 26a of the intervening linkage members 24c or 24d are fastened to the third and fourth suspension apertures 18a,18b of yoke plate 12. The eighth suspension apertures 26b of the intervening linkage members 24c or 24d are fastened to the fifth suspension apertures 22a of the first and second J-hook assemblies 20. FIGS. 8A-8D illustrate a four bundle wire suspender adapted for this. An example of this arrangement is shown in use in FIGS. 2F and 2G.

As will be understood by one skilled in the art, other examples exist; for example for supporting or suspending five, six or eight sub-conductors in a conductor bundle. In those further examples and others, the various components of the set are expanded to hold further sub-conductors. Using the example of a six sub-conductor bundle, a further pair of J-hook assemblies 20 would be added to the four bundle wire suspender in Example 5 above, intervening linkage members 24c or 24d, for example short linkage members 24d in the arrangement as seen in FIGS. 8A-8C, would be added, linked to and below, in a daisy-chain fashion, the existing pair of J-hook assemblies 20 being used to suspend the third and fourth sub-conductors. A further pair of J-hook assemblies 20 would then be linked to and below the further intervening linkage members 24c or 24d to suspend fifth and sixth sub-conductors. Removable fasteners such as bolts 48 and lock nuts 48a may be used to join the components together modularly by bolting the bolts through the suspension apertures in the various components of the set as required to support the desired number of conductors in the desired arrangement.

As may be seen, in the illustrated embodiments, the yoke plate may be a V-shaped flat plate so as to assist in giving sufficient separation between the upper conductors held in the left and right yoke plate conductor cradles 16a,16b, and a lower conductor held in a J-hook assembly 20 suspended, for example by a linkage member 24c or 24d, from the second suspension aperture 14b.

As seen in FIGS. 4A and 6A, shackle 28 may be coupled to the first suspension aperture 14a in yoke plate 12 for lifting of a conductor bundle using the present sub-conductor wire suspender by a crane or chain hoist, keeping in mind that the loading weight may be in the range of eight thousand or more pounds for the conductor bundle as each sub-conductor may weigh in the order of two or three thousand pounds. In the example of the first and second J-hook assemblies 20 supporting a two sub-conductor vertically disposed bundle (Example 2 above), a top link 32 is coupled to the fifth suspension aperture 22a of an upper J-hook assembly 20 of the vertical pair of J-hook assemblies. Top link 32 (FIG. 7A) couples the upper J-hook assembly 20 to the shackle 28.

Figure 10:
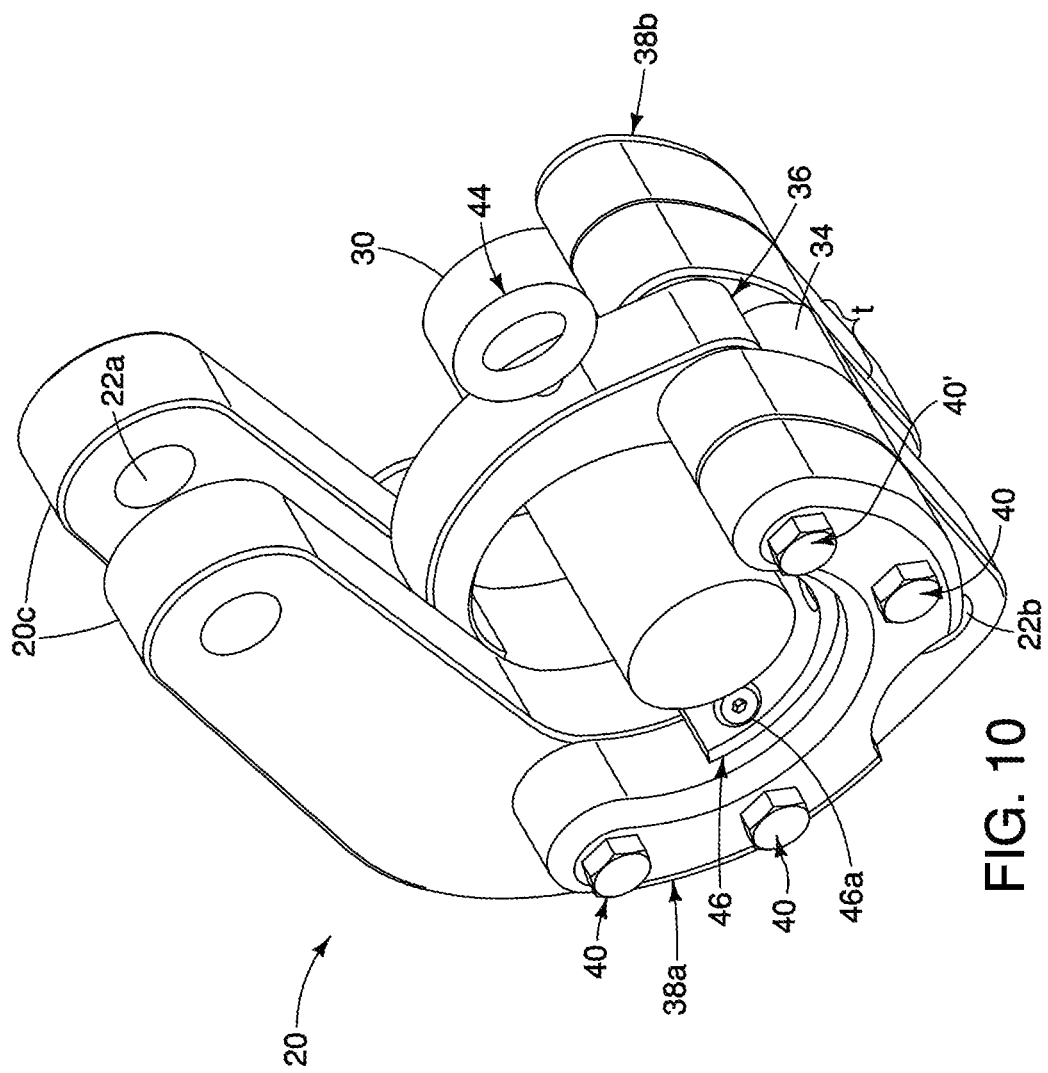
FIG. 10 is, in perspective view, a J-hook assembly of the temporary wire suspender according to the present disclosure.

In one embodiment, such as the embodiment illustrated in FIG. 10, each J-hook assembly 20 is made up of a parallel, spaced apart pair of hook-shaped plates 20c separated laterally by a latch assembly hook 34 having a thickness t between hook-shaped plates 20c. Hook-shaped plates 20c are spaced apart in order to accept one end, for example a lower end 24b of one of the linkage members 24c or 24d, either long linkage members 24c or short linkage members 24d, between upper ends of the hook-shaped plates 20c, and to sandwich or clamp latch assembly hook 34 between lower ends of the hook-shaped plates 20c. By way of example, as other dimensions would also work as would be known to one skilled in the art, yoke plate 12, hook-shaped plates 20c, linkage members 24, and latch assembly hook 34 may have a thickness t of for example 1.250 inches, and latch assembly arms 36 and outside clamp plates 38a and 38b, both described below, may have a thickness of 1.125 inches. By way of further example, as other dimensions would also work as would be known to one skilled in the art, J-hook assembly 20 may have a length of approximately 11 inches measured along axis B, and a maximum width of approximately 8 inches measured perpendicular to axis B in the plane containing and parallel to hook-shaped plates 20c.

Figure 3C:
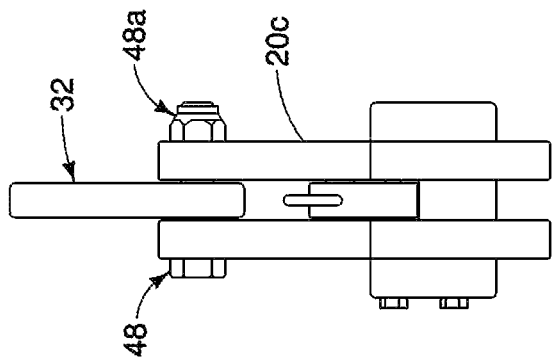
FIG. 3C is, in end elevation view, the single wire suspender J-hook assembly of FIG. 3.
Figure 3B:
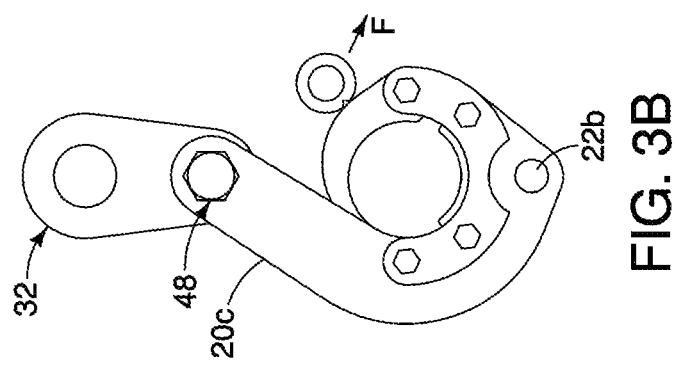
FIG. 3B is, in side elevation view, the single wire suspender J-hook assembly of FIG. 3.

As mentioned above, J-hook assemblies 20 each may advantageously further include a latch assembly having a latch assembly arm 36 and a latch assembly hook 34. The latch assembly arm 36 releasably closes over the opening 20d which opens into the conductor cradle 20b of hook 20a. In the illustrated embodiment, FIGS. 3D and 8A, not intended to be limiting, the latch assembly arm 36 is rotatably coupled at a first end 36a to a distal end of hook 20a so as to be selectively rotatable between an open position clear of the opening 20d into the hook 20a so as to allow capture of a conductor 30 into the conductor cradle 20b, and the closed position illustrated (e.g., FIG. 3B), closing across the opening 20d into the hook 20a so as to positively retain, and thus secure conductor 30 once suspended in the hook 20a.

Figure 17D:
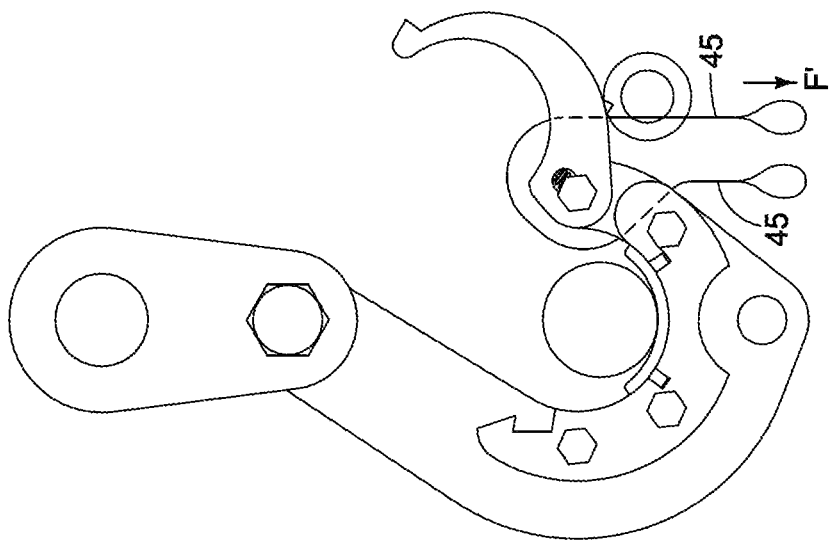
FIG. 17D is the J-hook assembly of FIG. 3D showing the alternative embodiment of an actuator for actuating the latch of FIG. 17A.
Figure 17C:
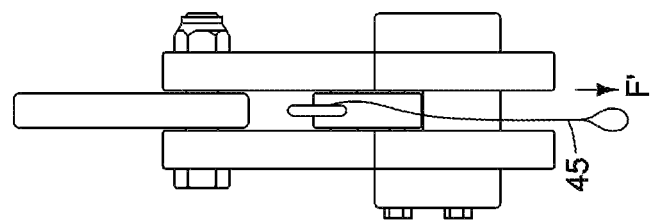
FIG. 17C is the J-hook assembly of FIG. 3C showing the alternative embodiment of an actuator for actuating the latch of FIG. 17A.
Figure 17B:
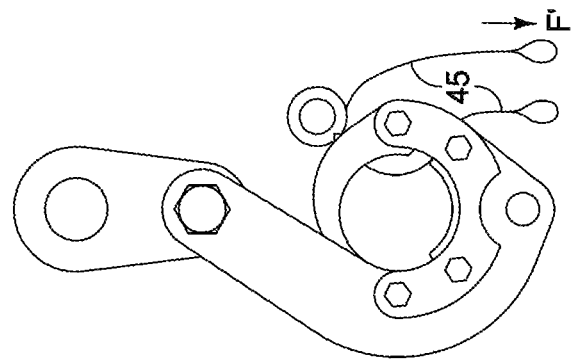
FIG. 17B is the J-hook assembly of FIG. 3B showing the alternative embodiment of an actuator for actuating the latch of FIG. 17A.
Figure 17A:
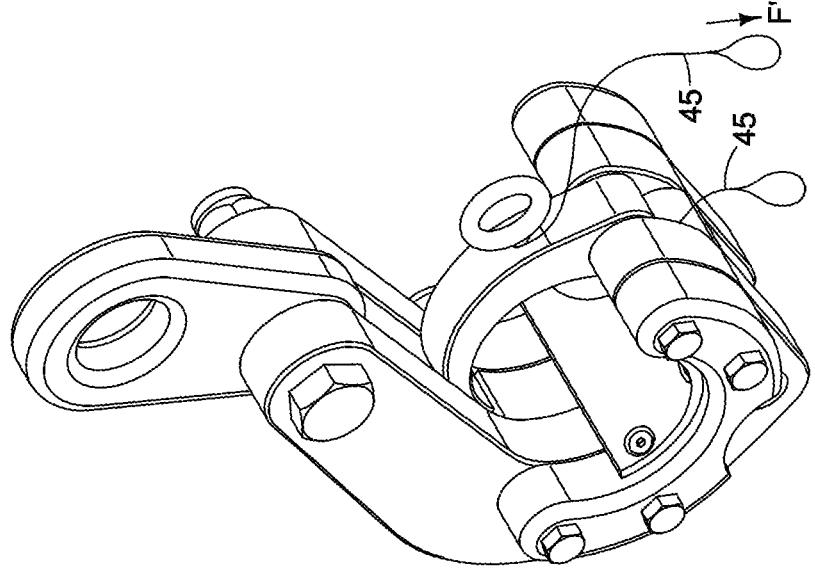
FIG. 17A is the J-hook assembly of FIG. 3 showing an alternative embodiment of an actuator for actuating the latch.

Applicant has contemplated various ways of remotely operating the latch assembly for opening and closing of the conductor cradle 20b. In a first contemplated embodiment, a tool, such as a hot stick having a hook attachment is used to hook onto an eyebolt 44 mounted on the upper side of latch assembly arm 36, so that pulling or pushing the eyebolt opens or closes the latch assembly. In a second contemplated embodiment, a flexible member such as a length of rope or cable 45, may be coupled to the latch assembly arm 36 for remote opening and closing of the latch assembly by the pulling on one end or the other of the rope or cable 45. FIG. 17A shows coupling of a rope or cable 45 to the latch assembly arm 36 for its opening and closing. The following paragraphs also describe coupling of a hot stick to the latch assembly through eye bolt 44 for opening and closing of the latch assembly.

Figure 14B:
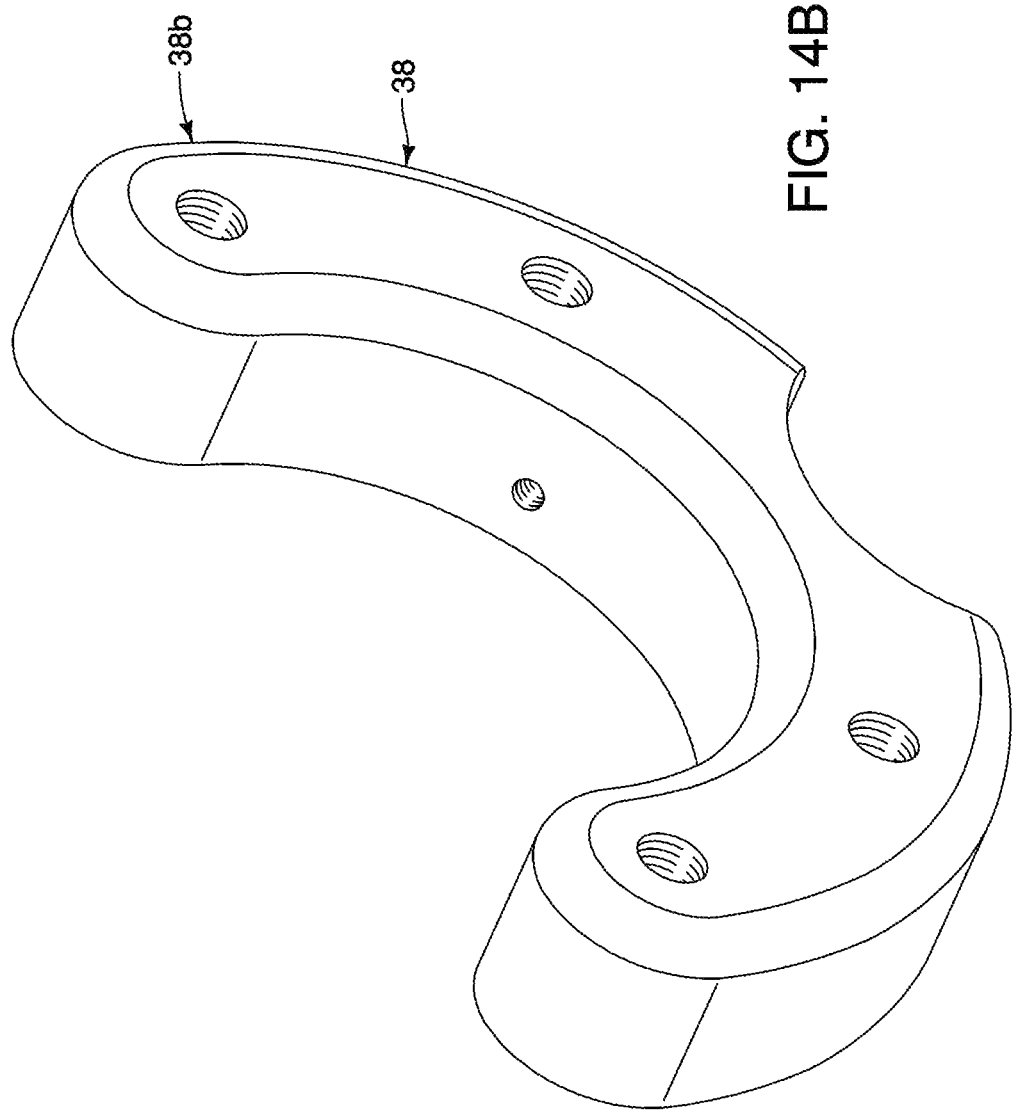
FIG. 14B is, in perspective view, a thread side outside clamp plate of the temporary wire suspender according to the present disclosure.
Figure 15:
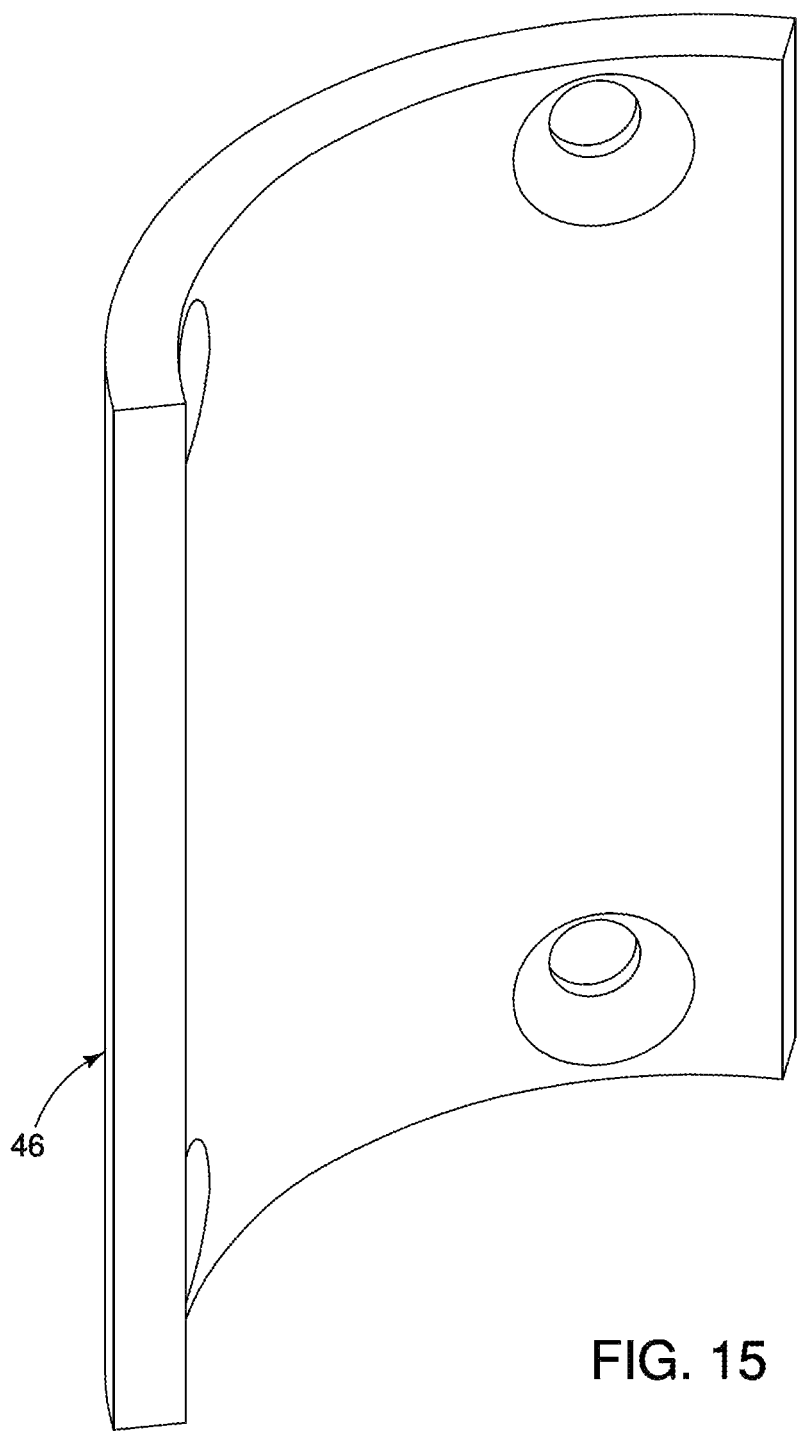
FIG. 15 is, in perspective view, a liner of the temporary wire suspender according to the present disclosure.
Figure 16:
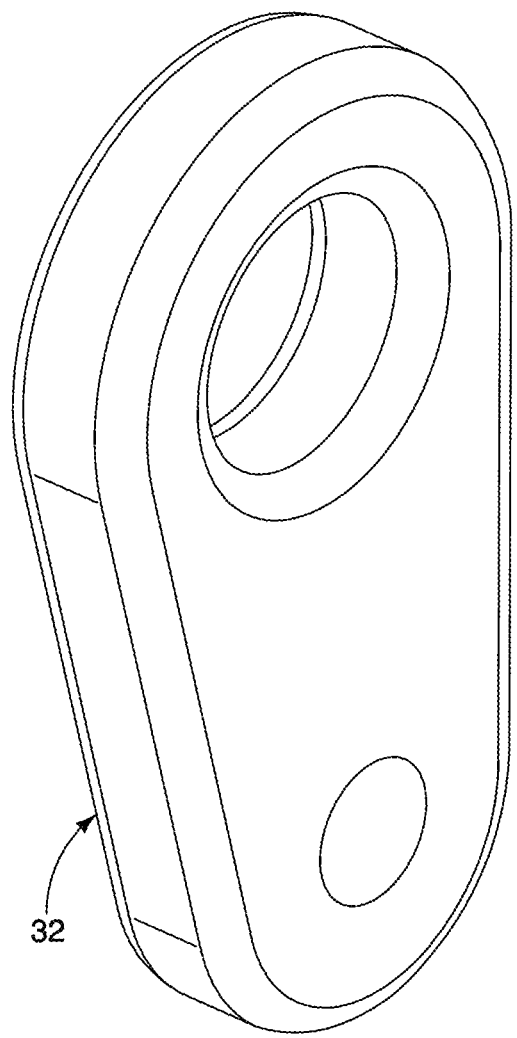
FIG. 16 is, in perspective view, a top link of the temporary wire suspender according to the present disclosure.

A pair of outermost U-shaped clamp plates 38; in particular plate 38a for the bolt end of bolts 40 (FIG. 14A) and plate 38b for the nut or thread end of bolts 40 (FIG. 14B), clamp together the pair of hook-shaped plates 20c and latch assembly hook 34 by means of bolts 40 journalled in and through corresponding bolt-holes. For example, in clamp plates 38b, the holes may be threaded to receive the threaded ends of bolts 40 to thereby tighten and clamp together the outside clamp plates 38a and 38b, hook plates 20c, and latch assembly hook 34.

In the illustrated embodiment, not intended to be limiting, the latch assembly arm 36 is rotatably coupled at first end 36a to the distal end of hook 20a, between the distal ends of hook-shaped plates 20c. Bolt 40' is mounted through the ends of the outside clamp plates 38a and 38b and hook-shaped plates 20c, making up the distal end of hook 20a, and in particular through corresponding bolt holes in the distal ends of the pair of hook-shaped plates 20c and the pair of outside clamping plates 38a and 38b mounted on the opposite sides of hook-shaped plates 20c. Outside clamping plates 38a and 38b clamp the pair of hook-shaped plates 20c which clamp the latch assembly hook 34 therebetween.

With reference to FIG. 13D, bolt 40' also passes through a slot 36b formed in the first end 36a of latch assembly arm 36. A latch tooth 36c is formed on the second end 36d of latch assembly arm 36, opposite the first end 36a. Latch tooth 36c lies on the longitudinal axis C of slot 36b. A spring 42 is mounted in slot 36b so as to extend between slot end 36b' and bolt 40' and held in place by set screw 36f (shown in FIG. 13D). Spring 42 resiliently urges latch assembly arm 36 in direction D along axis C so as to drive latch tooth 36c into a correspondingly shaped notch or hook 34a formed in the latch assembly hook 34.

When latch assembly arm 36 is in its closed position, translation in direction D (FIGS. 13A, 13B and 13D) of latch assembly arm 36 against the resilient return biasing force of spring 42 latches the latch assembly closed so that a conductor 30 held in the corresponding conductor cradle 20b is prevented from falling out of the conductor cradle and out of the opening 20d so as to fall from the J-hook assembly 20. Again, the latch assembly arm 36 when closed and latched provides secure positive control of the conductor 30, and thus increases safety. Translation of latch assembly arm 36 along slot 36b in a direction opposite to direction D against the return biasing force of spring 42 releases the second end 36d of latch assembly 36 from notch or hook 34a whereafter latch assembly arm 36 is rotatable in direction E into its open position. In one embodiment, a hot stick eye bolt 44 is rotatably mounted on the upper surface of latch assembly arm 36 so that a lineman may employ a hot stick (having, for example, a length of four feet or more, and having a hook tool end) to actuate latch assembly arm 36 between its open and closed positions. Angling axis C, the translation axis, of latch assembly arm 36 slightly upwardly from its axis of rotation G by for example 13 degrees, provides an improved angle for access by a lineman's hot stick to hot stick eye bolt 44.

Figure 3:
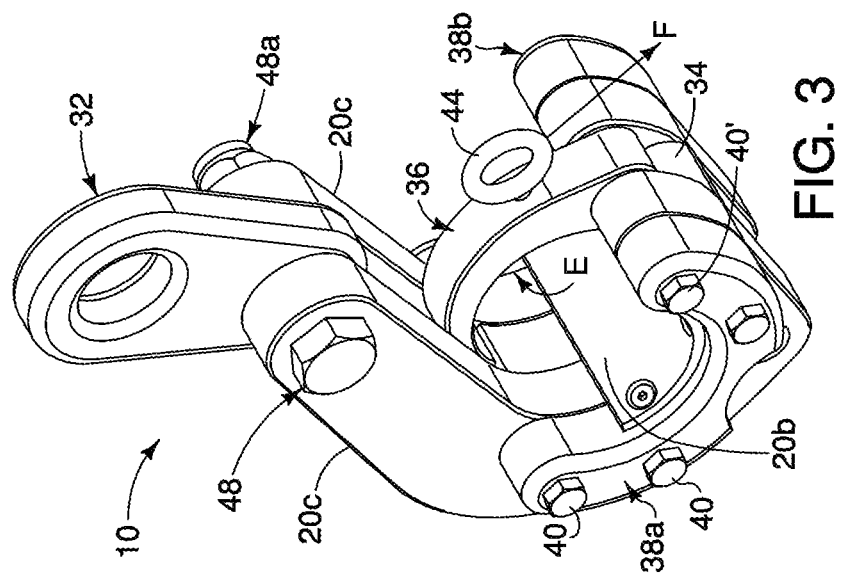
FIG. 3 is, in perspective view, a J-hook assembly of a single wire suspender according to the present disclosure for suspending a single conductor.
Figure 3D:
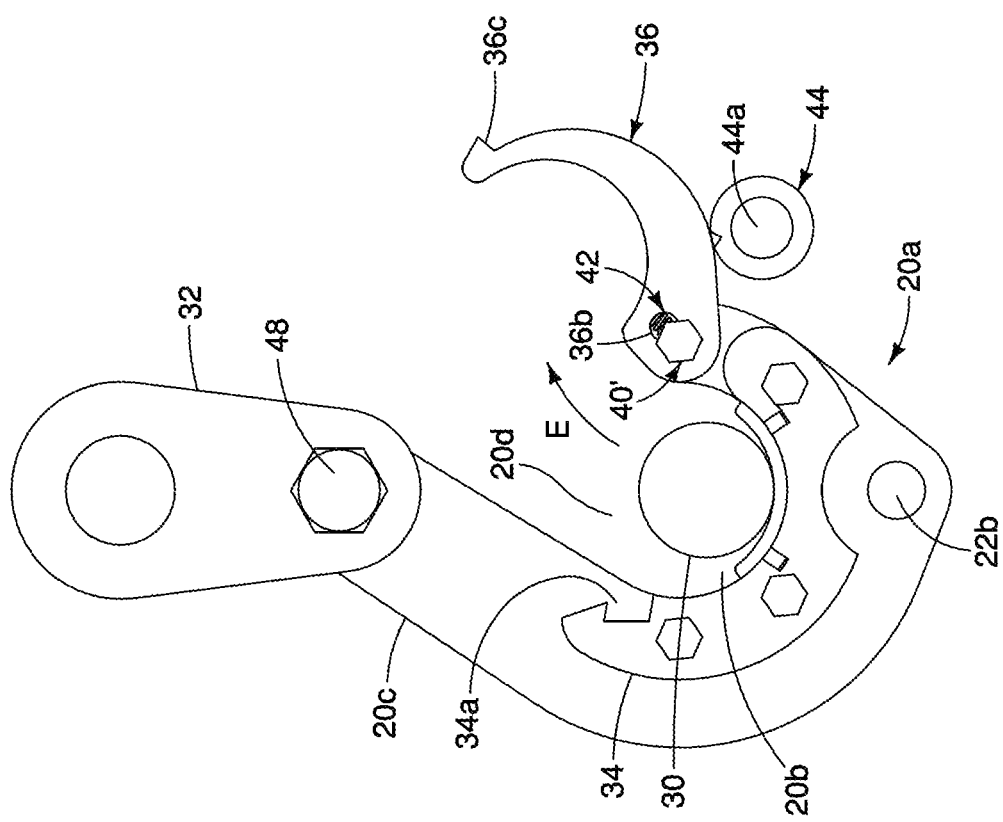
FIG. 3D is, in partially cut-away, side elevation view, showing the latch assembly in open position of the single wire suspender J-hook assembly of FIG. 3.
Figure 4D:
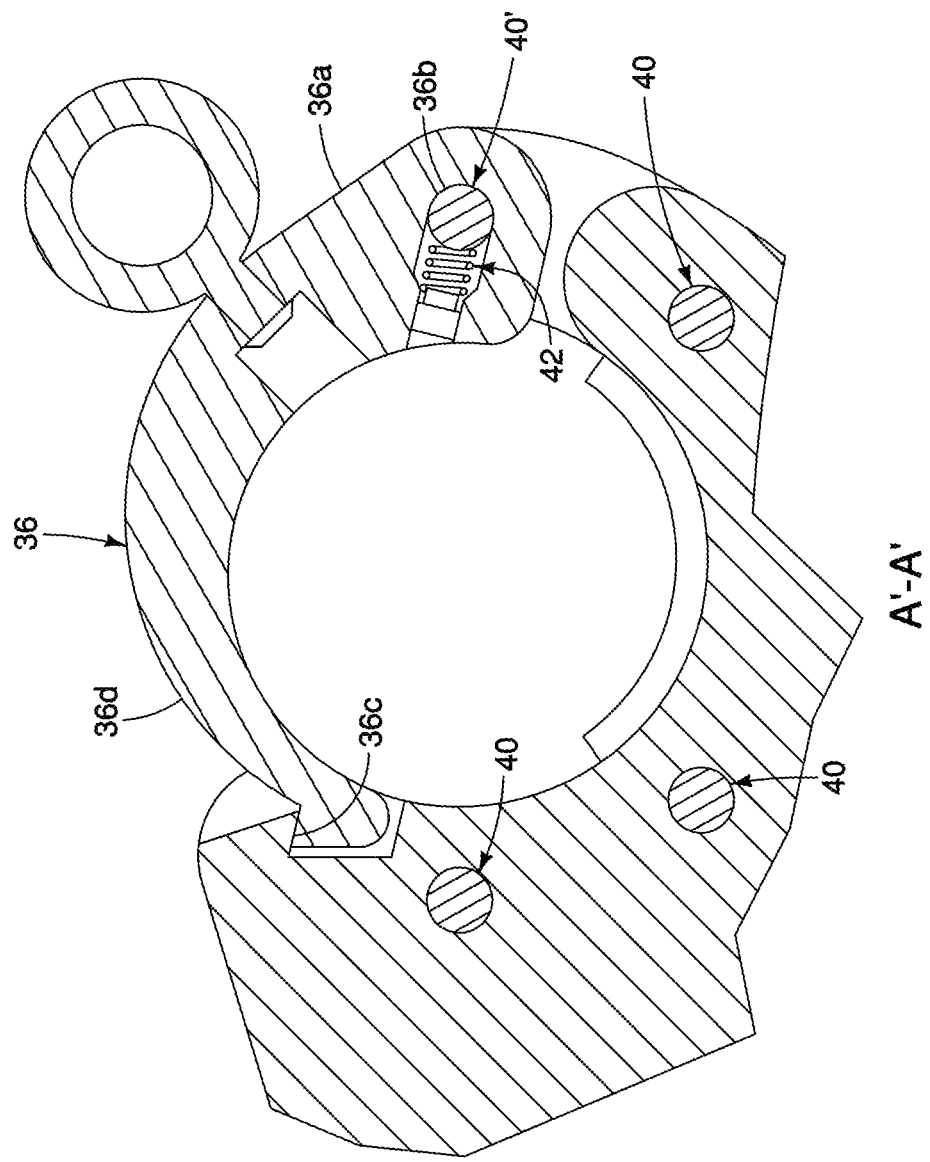
FIG. 4D is a sectional view, showing a latch assembly of the horizontal two bundle wire suspender, along line A'-A' in FIG. 4C.

To open latch assembly from its closed position, with the latch assembly in its closed and latched position, the hook on the end of the hot stick (not shown) is hooked by the lineman into the eye 44a of hot stick eye bolt 44 and the hot stick pulled in direction F (FIG. 3). Pulling in direction F translates latch assembly arm 36 over bolt 40' in slot 36b so as to compress spring 42 and simultaneously so as to disengage latch tooth 36c from notch or hook 34a. Once latch tooth 36c clears notch or hook 34a, latch assembly arm 36 is free to rotate in direction E under the continued tension by the hot stick in direction F. Once the conductor 30 is captured in the conductor cradle 20b, the hot stick is pushed in a direction opposite to direction F so as to rotate latch assembly arm 36 in a direction opposite to direction E. Continued rotation of latch assembly 36 engages latch tooth 36c with notch or hook 34a, and, once the two are aligned, the spring force of spring 42 urges the latch assembly arm 36 to secure latch tooth 36c into notch or hook 34a thereby releasably locking the latch assembly closed over opening 20d. Thus, the translation, opening and closing of the latch assembly arm 36 is controlled remotely by the lineman using the hot stick to, respectively, pull and push on the hot stick eye bolt 44.

The longitudinal axis of slot 36b is aligned along the translation axis C of latch assembly arm 36. Axis C may be substantially at right angles to the centroidal central axis B of the J-hook assembly 20, but advantageously is angled slightly upward from horizontal about the axis of rotation G of latch assembly arm 36. In the example of the illustrated embodiment, longitudinal axis C is inclined upwardly from horizontal by approximately 13 degrees as measured from the latch assembly axis of rotation G coinciding with bolt 40' which provides improved ease of access to a lineman using a hot stick to latch, unlatch and manipulate latch assembly arm 36.

The underside surface 36e of latch assembly arm 36 may be formed as approximately one half of a circle, and in particular the upper half of a full circle formed by the half-cylindrical surface of the conductor cradle 20b and the underside surface 36e when the latch assembly is in its closed position. The latch assembly is curved so as to form a curved inner surface, opposite the upper surface, wherein the curved inner surface and an inner surface of the hook form a circular enclosure encircling a conductor 30 cradled in the conductor cradle 20b in the hook 20a when the latch assembly is in the closed position.

Similar to the conductor cradles 20b in J-hook assemblies 20, yoke plate 12 has left and right yoke plate conductor cradles 16a,16b formed in opposite ends of the yoke plate. The left and right yoke plate conductor cradles include outside U-shaped clamp plates 38a and 38b mounted on opposite sides of the yoke plate sandwiching U-shaped spacer plates 50 therebetween. The outside clamp plates 38a and 38b and U-shaped spacer plates 50, when mounted on yoke plate 12, collectively form the curvature of the yoke plate conductor cradles. The use of outside clamp plates 38a and 38b and U-shaped spacer plates 50 extend in length the cradle support surface. Advantageously, the cradle support surface is covered by a liner 46. Without intending to be limiting, liner 46 may be a ultra high molecular weight (UHMW) polyethylene or other plastic or other wear resistant dielectric liner. The liner 46 may be secured by flathead screws 46a and supports and protects conductor 30 when the conductor is in the conductor cradles 16a,16b. The left and right yoke plate conductor cradles 16a,16b are each also selectively closed by corresponding latch assemblies. The latch assemblies function as described above for latch assemblies on J-hook assemblies 20. Instead of notch or hook 34a in J-hook assembly 20 engaging latch tooth 36c on latch assembly arm 36, a notch or hook 12a formed in both ends of yoke plate 12 engages latch tooth 36c on latch assembly arm 36, wherein the ends 12b,12c of yoke plate 12 replace the latch assembly hook 34 used in J-hook assembly 20. The latch assemblies on yoke plate 12 are pivotally mounted on the yoke plate ends 12b and 12c.

Thus, in the example of the four sub-conductor bundle assembled combination, the intervening linkage members 24 include a parallel pair of the linkage members 24d sandwiching the yoke plate 12 at an upper end of the pair of the linkage members 24d and sandwiching the upper end of a third linkage member 24 between lower ends of the pair of the linkage members 24d, wherein a lower end of the third linkage member is sandwiched between the upper ends of the pair of hook-shaped plates 20c of J-hook assemblies 20. A pair of outside U-shaped clamp plates 38a and 38b are mounted on opposite sides of the hook-shaped plates 20c of each J-hook assembly 20. The outside clamp plates 38a and 38b conform to the curvature of the hook-shaped plates 20c so as to extend in length the support surface of the conductor cradle. The liner 46 protects and supports conductor 30 in hook 20a. Adding additional U-shaped spacers (not shown) between outside clamp plates 38a and 38b and hook plates 20c would allow the support length in conductor cradle 20b to be lengthened so that heavier conductors may be supported in the cradles with reduced risk of damage to the conductor due to an upward concentration of force caused by the support surface in the cradle being too small.

As will be apparent to those skilled in the art in the light of the foregoing disclosure, many alterations and modifications are possible in the practice of this disclosure without departing from the spirit or scope thereof. Accordingly, the scope of the disclosure is to be construed in accordance with the substance defined by the following claims.

The invention claimed is:

1. A set of components for assembling a temporary wire suspender for temporarily suspending a plurality of conductors or sub-conductors, separated from each other by a pre-set clearance, the set comprising:
   a yoke plate having left and right yoke plate conductor cradles and a yoke plate engagement structure;
   a plurality of J-hook assemblies, each J-hook assembly having a corresponding conductor cradle and a corresponding J-hook engagement structure;
   a plurality of elongate linkage members, each linkage member having a corresponding engagement structure;
   and a plurality of removable couplers adapted to releasably, selectively and mechanically couple the yoke plate, the plurality of J-hook assemblies, and the plurality of linkage members through their corresponding engagement structures into multiple wire suspender assembled combinations to temporarily suspend the plurality of conductors or sub-conductors, wherein the assembled combination for use with sub-conductors is an assembled combination comprising:
   a four sub-conductor wire suspender comprising the yoke plate and first and second J-hook assemblies of the plurality of J-hook assemblies coupled to ends of the yoke plate through the plurality of linkage members such that the first and second J-hook assemblies depend downwardly from the yoke plate,
   and wherein first and second sub-conductors of the plurality of sub-conductors are suspended in the left and right yoke plate conductor cradles and third and fourth sub-conductors of the plurality of sub-conductors are suspended in corresponding conductor cradles of the first and second J-hook assemblies, separated from each other by the pre-set clearance.

2. The set of claim 1, wherein the engagement structures are suspension apertures in the yoke plate, the plurality of J-hook assemblies and the plurality of elongate linkage members, respectively.

3. The set of claim 2, wherein the plurality of removable couplers are fasteners adapted to cooperate with the suspension apertures.

4. The set of claim 2, wherein each J-hook assembly of the plurality of J-hook assemblies includes a pair of parallel, spaced apart hook-shaped plates.

5. The set of claim 4, wherein each J-hook assembly includes a latch assembly located between lower ends of the hook-shaped plates for opening and closing of the conductor cradle of the J-hook assembly, and wherein a suspension aperture of the suspension apertures is formed between upper ends of the hook-shaped plates.

6. The set of claim 5, wherein the latch assembly is adapted to operatively engage a tool during use, whereby operation of the latch assembly is controllable remotely through the tool.

7. The set of claim 6, wherein the tool is a dielectric flexible member.

8. The set of claim 1, wherein the yoke plate is a V-shaped flat plate and the yoke plate conductor cradles include left and right yoke plate conductor cradles formed in opposite ends of the V-shaped flat plate.

9. The set of claim 8, wherein the left and right yoke plate conductor cradles include outside U-shaped clamp members and U-shaped spacers to extend in length a cradle support surface of the yoke plate conductor cradles.

10. The set of claim 8 further comprising a liner mounted on the cradle support surface.

11. The set of claim 8, wherein each of the left and right yoke plate conductor cradles includes a latch assembly for opening and closing of the corresponding conductor cradles.

12. The set of claim 11, wherein the latch assembly is adapted to operatively engage a tool during use, whereby operation of the latch assembly is controllable remotely through the tool.

13. The set of claim 12, wherein the tool is a dielectric flexible member.

14. A method for temporarily suspending a plurality of sub-conductors, separated from each other by a pre-set clearance, the method comprising:
   providing the set of components of claim 1;
   assembling a temporary wire suspender having one of the assembled combinations of claim 1, the temporary wire suspender comprising a plurality of conductor cradles;
   moving the plurality of sub-conductors from their primary location; and
   locating the plurality of sub-conductors in the plurality of the conductor cradles such that a weight of the plurality of sub-conductors is suspended by the temporary wire suspender, and the plurality of sub-conductors are secured in the temporary wire suspender and are separated from each other by the pre-set clearance.

15. A set of components for assembling a temporary wire suspender for temporarily suspending a plurality of conductors or sub-conductors, the set comprising:
   a yoke plate having: first and second, correspondingly upper and lower, suspension apertures formed in the yoke plate along a centroidally located vertical axis of symmetry of the yoke plate, and wherein oppositely disposed left and right yoke plate conductor cradles are formed in the yoke plate and symmetrically spaced apart in the yoke plate from the vertical axis of symmetry of the yoke plate, and third and fourth suspension apertures formed in the yoke plate below the left and right yoke plate conductor cradles respectively;
   a plurality of J-hook assemblies, each J-hook assembly of the plurality of J-hook assemblies having a hook so as to form a corresponding conductor cradle at a lower end thereof and having fifth and sixth, correspondingly upper and lower, suspension apertures formed in each J-hook assembly respectively above and below the J-hook assembly conductor cradle along a centroidal vertical axis of the J-hook assembly;
   a plurality of elongate linkage members, each linkage member of the plurality of elongate linkage members having seventh and eighth suspension apertures formed therein at opposite ends thereof;
   and wherein the first, second, third, fourth, fifth, sixth, seventh and eighth suspension apertures in the yoke plate, the plurality of J-hook assemblies, and the plurality of elongate linkage members, respectively, are adapted to be releasably coupled, using a plurality of removable couplers, into multiple wire suspender assembled combinations to temporarily suspend the plurality of conductors or sub-conductors, wherein the assembled combination for use with sub-conductors is an assembled combination comprising:

a four sub-conductor wire suspender combination wherein first and second sub-conductors of the plurality of sub-conductors are suspended in the left and right yoke plate conductor cradles, and wherein third and fourth sub-conductors of the plurality of sub-conductors are suspended in first and second J-hook assemblies of the plurality of J-hook assemblies coupled by their fifth suspension apertures to the third and fourth suspension apertures in the yoke plate by intervening linkage members of the plurality of elongate linkage members, the seventh suspension apertures of the intervening linkage members coupled to the third and fourth suspension apertures of the yoke plate, and the eighth suspension apertures of the intervening linkage members coupled to the fifth suspension apertures of the first and second J-hook assemblies.

16. The set of claim 15, wherein the yoke plate is a V-shaped flat plate.

17. The set of claim 16, wherein the left and right yoke plate conductor cradles are formed in opposite ends of the yoke plate.

18. The set of claim 17, wherein the left and right yoke plate conductor cradles further include outside U-shaped clamp members and U-shaped spacers mounted on opposite sides of the yoke plate conductor cradles which conform to the curvature of the yoke plate conductor cradles so as to extend in length a cradle support surface in the conductor cradles.

19. The set of claim 18 further comprising a liner mounted on the cradle support surface.

20. The set of claim 15 further comprising a shackle for coupling to the first suspension aperture.

21. The set of claim 15 further comprising a top link for coupling to the fifth suspension aperture of an upper J-hook assembly of the first and second J-hook assemblies suspending the first and second sub-conductors, wherein the top link couples the upper J-hook assembly to a shackle.

22. The set of claim 15, wherein each J-hook assembly of the plurality of J-hook-assemblies is a parallel, spaced apart pair of hook-shaped plates spaced apart to sandwich one end of one of the elongate linkage members between upper ends of the hook-shaped plates, and to sandwich a latch assembly between lower ends of the hook-shaped plates, wherein the latch assembly releasably opens and closes an opening formed in the hook of the J-hook assembly.

23. The set of claim 22, wherein a latch assembly arm of the latch assembly is rotatably coupled at a first end thereof to a distal end of the hook of the J-hook assembly so as to be selectively rotatable between an open position clear of the opening into the hook so as to allow capture of a conductor or a sub-conductor of the plurality of conductors or sub-conductors into the hook, and a closed position closing across the opening into the hook so as to retain the conductor or the sub-conductor of the plurality of conductors or sub-conductors once suspended in the hook.

24. The set of claim 23, wherein a slot is formed in the first end of the latch assembly arm and the distal end of the hook is slidably mounted into the slot to allow translation of the latch assembly arm relative to the hook, and wherein a second end of the latch assembly arm, opposite the first end of the latch assembly arm, is formed to releasably latch against a cooperatively shaped formation in a shank of the J-hook assembly, and wherein a spring is mounted in the slot, resilient biasing of the spring resiliently urging the latch assembly arm, and thus the second end of the latch assembly arm, against the formation in the shank when the latch assembly arm is in its closed position, wherein, translation of the latch assembly arm by the resilient biasing of the spring along the slot urges the second end of the latch assembly arm into the formation in the shank, and mechanical urging of the latch assembly arm in a reverse direction against the return biasing force of the spring releases the second end of the latch assembly arm from the formation in the shank, whereafter the latch assembly arm is rotatable into its open position.

25. The set of claim 24, wherein the formation is a notch or hook, and wherein a correspondingly shaped latch tooth is formed on the second end of the latch assembly arm to releasably engage the notch or hook so as to releasably lock the latch assembly arm in its closed position.

26. The set of claim 23, wherein the latch assembly arm is curved so as to form a curved inner surface, opposite an upper surface thereof, wherein the curved inner surface and an inner surface of the hook form a circular enclosure encircling the conductor or the sub-conductor of the plurality of conductors or sub-conductors cradled in the hook when the latch assembly arm is in the closed position.

27. The set of claim 24, wherein the slot and the direction of translation of the latch assembly arm is substantially at right angles to the centroidal central axis of the J-hook assembly.

28. The set of claim 22, wherein the latch assembly is adapted to receive therein a tool during use, whereby the translation and opening and closing of the latch assembly is controllable remotely through the tool.

29. The set of claim 28, wherein the tool is a dielectric flexible member.

30. The set of claim 15, wherein the left and right yoke plate conductor cradles each are also selectively opened and closed by a corresponding latch assembly.

31. The set of claim 30, wherein the latch assembly is rotatably mounted on the yoke plate.

32. The set of claim 30, wherein each latch assembly of the left and right yoke plate conductor cradles is adapted to operatively engage a tool during use, whereby operation of the latch assembly is controllable remotely through the tool.

33. The set of claim 32, wherein the tool is a dielectric flexible member.

34. The set of claim 15, wherein, in the four sub-conductor wire suspender, the intervening linkage members include a parallel pair of the linkage members sandwiching the yoke plate at an upper end of the pair of the linkage members and sandwiching the upper end of a third linkage member between lower ends of the pair of the linkage members, wherein a lower end of the third linkage member is sandwiched between upper ends of a pair of J-hook assemblies.

35. The set of claim 15, wherein pairs of outside U-shaped clamp members are mounted on opposite sides of the hooks of each J-hook assembly which conform to the curvature of the hooks so as to extend in length a hook support surface in the hooks.

36. The set of claim 35 further comprising a liner mounted on the hook support surface.

\* \* \* \* \*